(12) United States Patent  
Mandre et al.

(10) Patent No.: US 10,087,910 B2  
(45) Date of Patent: Oct. 2, 2018

(54) KINETIC ENERGY HARVESTING USING CYBER-PHYSICAL SYSTEMS

(71) Applicant: Brown University, Providence, RI (US)

(72) Inventors: Shreyas Mandre, Providence, RI (US); Kenneth Breuer, Newton, MA (US); Benjamin Strom, Providence, RI (US); Michael Miller, Providence, RI (US); Jennifer Franck, Providence, RI (US); Daegyoum Kim, Providence, RI (US)

(73) Assignee: BROWN UNIVERSITY, Providence, RI (US)

( * ) Notice: Subject to any disclaimer, the term of this patent is extended or adjusted under 35 U.S.C. 154(b) by 811 days.

(21) Appl. No.: 14/160,337

(22) Filed: Jan. 21, 2014

(65) Prior Publication Data

US 2014/0203558 A1    Jul. 24, 2014

Related U.S. Application Data

(60) Provisional application No. 61/754,757, filed on Jan. 21, 2013.

(51) Int. Cl.
| | |
|---|---|
| *F03B 15/00* | (2006.01) |
| *F03B 13/26* | (2006.01) |
| *F03B 17/06* | (2006.01) |

(52) U.S. Cl.
CPC ............ *F03B 15/00* (2013.01); *F03B 13/264* (2013.01); *F03B 17/06* (2013.01); *F05B 2260/70* (2013.01); *Y02E 10/28* (2013.01)

(58) Field of Classification Search
CPC .. F03B 15/00; F03B 13/10; F01D 7/00; F03D 5/06; B63H 1/08
See application file for complete search history.

(56) References Cited

U.S. PATENT DOCUMENTS

| 4,247,251 A | * | 1/1981 | Wuenscher | ............... F03D 7/06 416/114 |
| 4,255,085 A | * | 3/1981 | Evans | ..................... F03D 3/061 416/178 |

(Continued)

FOREIGN PATENT DOCUMENTS

| EP | 1970302 A1 | * | 9/2008 | ............... B63H 1/32 |
| EP | 1970302 B1 | * | 11/2012 | ............... B63H 1/32 |

(Continued)

*Primary Examiner* — Mark Laurenzi  
*Assistant Examiner* — Shafiq Mian  
(74) *Attorney, Agent, or Firm* — Adler Pollock & Sheehen P.C.; Daniel J. Holmander, Esq.

(57) ABSTRACT

The present invention provides a system for engaging a fluid flow. The system comprising one or more foil members operationally connected to a feedback control loop system. In one embodiment, the foil member is a hydrofoil member or an airfoil member. The foil members are configured for one or more degrees of freedom of oscillatory movement within the fluid flow. The feedback control loop system comprises a sensor system, actuator system, and a controller system. The feedback control loop system configured for actuating the foil members and thereby optimizing the operation of the foil members to attain one or more optimization objectives. In operation, the foil members are situated in the fluid flow and are manipulated to attain one or more optimization objectives.

28 Claims, 20 Drawing Sheets

(56) References Cited

U.S. PATENT DOCUMENTS

| | | | | |
|---|---|---|---|---|
| 4,430,044 A | * | 2/1984 | Liljegren | F03D 7/06 416/119 |
| 5,008,863 A | * | 4/1991 | Archibald | G10K 11/006 114/275 |
| 6,273,680 B1 | * | 8/2001 | Arnold | F03B 17/00 416/1 |
| 6,877,692 B2 | * | 4/2005 | Liu | B63H 1/36 244/22 |
| 6,884,020 B2 | * | 4/2005 | Kaare, Jr. | F03B 17/065 415/1 |
| 7,455,503 B2 | | 11/2008 | Paish | |
| 7,493,759 B2 | * | 2/2009 | Bernitsas | F03B 17/06 60/497 |
| 7,573,143 B2 | | 8/2009 | Frayne | |
| 7,686,583 B2 | | 3/2010 | Siegel | |
| 7,762,776 B2 | | 7/2010 | Siegel | |
| 7,772,712 B2 | | 8/2010 | Frayne | |
| 7,791,214 B2 | * | 9/2010 | Hill | F03B 13/264 290/43 |
| 7,821,144 B2 | | 10/2010 | Frayne | |
| 7,986,051 B2 | | 7/2011 | Frayne | |
| 8,026,619 B2 | | 9/2011 | Frayne | |
| 8,047,232 B2 | | 11/2011 | Bernitsas et al. | |
| 8,100,078 B2 | * | 1/2012 | Storteig | G01V 1/3826 114/244 |
| 8,100,650 B2 | | 1/2012 | Siegel | |
| 8,193,657 B2 | | 6/2012 | Paluszek et al. | |
| 8,450,872 B2 | * | 5/2013 | Huang | F03D 3/005 290/44 |
| 8,469,663 B2 | * | 6/2013 | Kerr | F03B 17/062 416/1 |
| 9,315,249 B2 | * | 4/2016 | Thouret | F16H 21/40 |
| 9,494,129 B2 | * | 11/2016 | Ko | F03B 13/264 |
| 9,562,434 B2 | * | 2/2017 | Liu | F03B 13/264 |
| 2007/0215747 A1 | * | 9/2007 | Siegel | B63H 1/04 244/9 |
| 2007/0297903 A1 | | 12/2007 | Morris | |
| 2008/0048455 A1 | | 2/2008 | Carney | |
| 2009/0114001 A1 | | 5/2009 | Bernitsas et al. | |
| 2009/0121490 A1 | | 5/2009 | Platzer et al. | |
| 2010/0013237 A1 | | 1/2010 | Jones | |
| 2010/0135807 A1 | | 6/2010 | Paish | |
| 2010/0143115 A1 | | 6/2010 | Kerr | |
| 2010/0308592 A1 | | 12/2010 | Frayne | |
| 2011/0031754 A1 | | 2/2011 | Paish | |
| 2011/0156398 A1 | | 6/2011 | Paish | |
| 2011/0260453 A1 | | 10/2011 | Frayne | |
| 2012/0171035 A1 | | 7/2012 | Fransen | |

FOREIGN PATENT DOCUMENTS

| | | |
|---|---|---|
| WO | 03048568 A1 | 6/2003 |
| WO | 2005090777 A1 | 9/2005 |
| WO | 2005108781 A1 | 11/2005 |
| WO | 2012025754 A1 | 3/2012 |
| WO | 2012025755 A2 | 3/2012 |
| WO | 2012040834 A1 | 4/2012 |

\* cited by examiner

KINETIC ENERGY HARVESTING USING CYBER-PHYSICAL SYSTEMS

CROSS REFERENCE TO RELATED APPLICATION

This non-provisional patent application is related to and claims priority from earlier filed U.S. Provisional Patent Appl. No. 61/754,757 filed Jan. 21, 2013 and incorporated by reference herein.

STATEMENT REGARDING FEDERALLY SPONSORED RESEARCH

This invention was made with government support under ARPA-E Grant No. DE-AR0000318. The government has certain rights in the invention.

BACKGROUND OF THE INVENTION

The present invention generally relates to a cyber-physical method, apparatus, and system for converting kinetic energy from a fluid flow. More particularly, the present invention provides a system for interacting with or manipulating a fluid flow to attain one or more optimization objectives.

Marine and hydrokinetic tidal energy, or kinetic energy of flowing water, has great potential, especially in the United States. Generally, hydrokinetic energy in the United States is largely located near densely populated areas, and as a result, has yet to be significantly harnessed.

Unlike other renewable energy sources like wind and solar, the availability of hydro-kinetic energy is highly predictable and not associated with harmful emissions. The density of hydrokinetic energy in regions of reasonably fast flows is high, and unlike wind energy, the turbulent flow fluctuations are expected to be low so dynamic loading and material fatigue is less of a concern for hydrokinetic power.

Many of the currently available technologies for hydrokinetic energy conversion are statically optimized for a fixed set of operating conditions and are unable to adapt to ever changing environments and circumstances. The vast majority of the currently available technologies employ a rotating turbine for energy capture from the flow. These systems are static and have a single design criteria, to maximize power conversion at the design flow speeds. Since each site for tidal hydro-kinetic power conversion is unique, and the conditions at that site vary over tidal, lunar, an solar cycles, turbines designed for one location cannot be installed in another without expensive redesign or reconfiguration.

Referring to FIG. 1, for example, an installed turbine is shown. The turbines all borrow technology from their close cousins, wind turbines and this technology is relatively mature. Most aero- and hydro-dynamic technologies that exist today (aircraft wings and blades, propellers, turbines, sails) are designed to operate under steady or quasi-steady conditions, and extreme care is taken to mitigate any unsteadiness in their operation.

In such tidal turbines, the flow of oncoming water deflects the turbine blades and because the blades are pivoted at the center of the turbine, causes them to rotate. Fundamental fluid dynamics imposes a bound of about 59%, called the Betz limit, on the highest efficiency with which such turbines can extract the energy of the impinging flow. Current turbines perform with an efficiency close to the Betz limit only when the flow speed is close to a designed speed due to their fixed blade design. Shrouded turbines can improve upon this limit, but at significant structural (and financial) cost.

However, engineering efficiency for fixed flow conditions is not a suitable metric for determining economic feasibility. There are several drawbacks to fixed design tidal turbines. Firstly, they need to be designed and optimized for site-specific target conditions. Such an optimization not only means that a careful, time-consuming and expensive site survey needs to be carried out to identify potential site. A design that is easily adaptable and does not need hardware tuning is economically desirable because then economy of scale can be used for reducing installation costs.

Referring to FIG. 2, the second and largely unforeseen reason for the unattractiveness of fixed design turbines is that desired characteristics of the turbines may change in the future, not only due to environmental changes but also due to large scale deployment of tidal power farms themselves. Turbines extract energy by modifying the flow, thus it is expected that as tidal turbine farms grow, the local flow around each turbine may be completely different. A single turbine designed for the undisturbed site may become completely unsuitable as more turbines are installed and the local flow environment changes. A turbine design that can adapt to its neighboring turbines and can adjust its operating behavior as the farm grows would provide substantial economic advantages. Also, the diameter of a rotary turbine is limited by the depth of water at the site, which is very low at tidal energy hotspots. Moreover, the rotary turbines interfere with each other if they are close to each other, and that means a lot of flow kinetic energy is lost from between the turbines.

Conservation of marine ecology provides yet another concern for rotary design turbines. Many locations ideal for tidal in-stream power farms around the world are close to rich marine ecology habitats such as marshlands and coral reefs. The rotary design turbines are also static structures, so they hinder navigation of shipping traffic and also marine mammals. These ecosystems are extremely fragile and rely on the marine hydro-kinetic flow to transport nutrients, sediment, gametes, etc. to survive. A number of studies have investigated the effect of tidal power farms on the marine environment and ecology. The short term effects associated with installing individual tidal turbines are well understood and can easily be addressed. However, the long term effects that arise from cumulative action of turbines in a tidal power farm and possibly over a long time are virtually unknown. Any large scale power extraction is likely to alter the flow and thus influence the marine geology and ecology on the long time-scale by modifying the transport of nutrients, sediment, gametes, etc. The modified flow could also effect populations of organisms with a planktonic life stage, and their predators. At this time we have no method for predicting the subsequent evolution of marine habitats, thus the environmental cost of tidal power conversion is unknown.

Because of the large scale design uncertainty and environmental unpredictability with building tidal power farms, the financial risk is sufficiently high that ventures towards large scale farm development are still relatively rare and market penetration is only likely to be successful when a hydro-kinetic conversion technology adequately addresses these uncertainties. The practical and economically sensible strategy for building tidal power farms is through gradual expansion of installed infrastructure whilst continually monitoring the engineering design and environmental impact, and rapidly and cheaply addressing any concerns that arise. Current tidal turbines are not capable of rapid and cheap re-design and therefore are inappropriate for tidal hydro-kinetic energy.

It would therefore be desirable to provide a more efficient and optimized method, apparatus, and system for converting kinetic energy from a fluid flow.

BRIEF SUMMARY OF THE INVENTION

The present invention generally relates to a cyber-physical method, apparatus, and system for converting kinetic energy from a fluid flow. More particularly, the present invention provides a system for interacting with, manipulating, or engaging a fluid flow to attain one or more optimization objectives. The system comprising one or more foil members operationally connected to a feedback control loop system. In one embodiment, the foil member is a hydrofoil member, airfoil member, or combination thereof. The foil members configured for one or more degrees of freedom of oscillatory movement within the fluid flow. The fluid flow may be a bi-direction fluid flow. In one embodiment, the two degrees of freedom of the foil members is pitch and plunge.

The feedback control loop system comprising a sensor system, actuator system, and a controller system. The feedback control loop system configured for optimizing the operation of the foil members to attain one or more optimization objectives.

The sensor system is configured for directly or indirectly measuring and monitoring the optimization objective during a predetermined time interval. The sensor system is configured to determine the energy extracted by monitoring and measuring the foil members degrees of freedom of motion and its conjugate forces. The sensor system is connected to the foil members.

The actuator system is operationally connected to the foil members. The actuator system is configured to manipulate the degrees of freedom of motion of the foil members. In addition, the actuator system is configured to submerge the foil member near or on a bed of a body of water when inactive.

The controller system is operationally connected to the sensor system to receive the sensor data and the actuator system to manipulate the foil members. The controller system is operated by optimization algorithms utilizing the sensor data. The controller system is configured for instructing the actuator system to manipulate the foil members to attain one or more optimization objectives. In one embodiment, the controller system comprises a software for automatically manipulating the foil members to attain the one or more optimization objectives.

A first optimization objective is optimization of energy extraction from the fluid flow.

A second optimization objective is the manipulation of a quantifiable effect downstream of the foil member to attain modified turbulence, mixing, or sediment deposition.

A third optimization objective is to regulate the force on multiple foil members to minimize drag or maximize thrust using minimum energy expenditure. It should be noted that the one or more optimization objectives or the optimization algorithms are configured to be updated or modified.

Additional components or elements may be added to enhance the operation of the system. To provide stability to the system, one or more support mechanisms may be connected to the actuator system. A means for extracting energy from the oscillatory movement of the one or more foil members may be provided. A linking means may be provided for allowing the foil members to oscillate within the fluid flow. Also, the foil members may be arranged in a cluster whereby the system is configured to or automatically through hydrodynamic interactions and the optimization algorithms synchronize the foil members to mimic operation of a monolithic large scale structure.

In operation, the foil members are situated in the fluid flow and are manipulated to attain one or more optimization objectives.

Also, a method is provided for interacting with and manipulating a fluid flow. The method comprises providing one or more foil members configured for one or more degrees of freedom of oscillatory movement within the fluid flow. The foil members operating to oscillate within the fluid flow. The operation of the foil members are optimized to attain one or more optimization objectives using a feedback control loop system. In operation, the foil members are situated in the fluid flow and are manipulated to attain one or more optimization objectives.

BRIEF DESCRIPTION OF THE DRAWINGS

The novel features which are characteristic of the present invention are set forth in the appended claims. However, the method, apparatus, and system of the present invention together with further embodiments and attendant advantages, will be best understood by reference to the following detailed description taken in connection with the accompanying drawings in which:

DETAILED DESCRIPTION OF THE PREFERRED EMBODIMENTS

Figure 1:
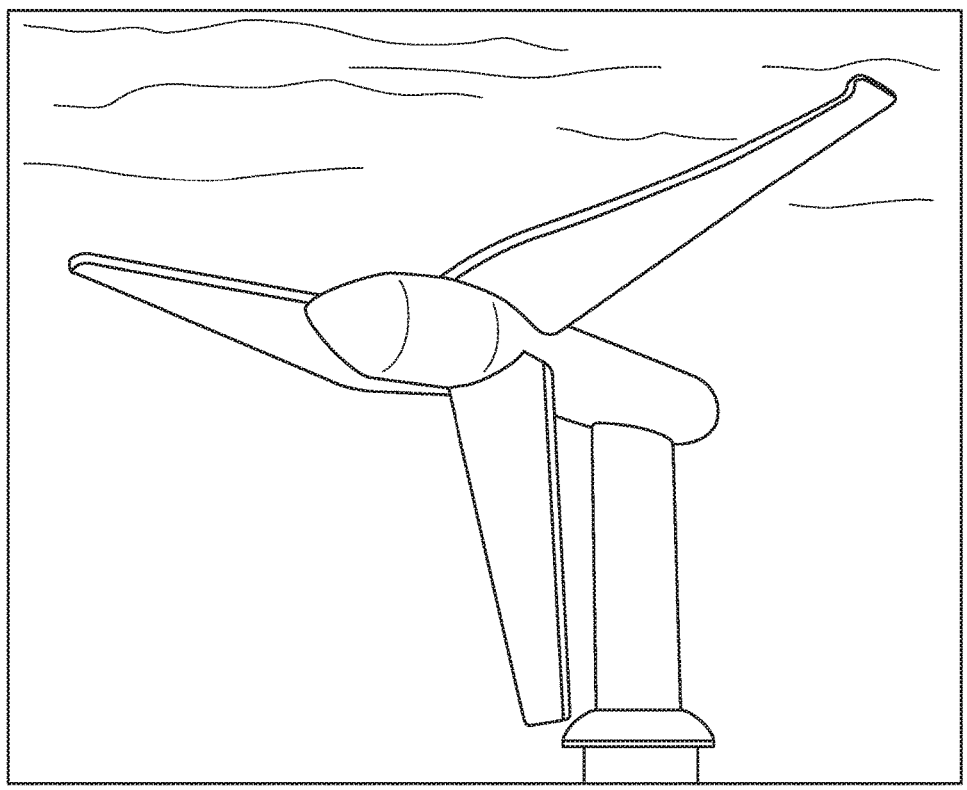
FIG. 1 is a prior art example of a tidal turbine.
Figure 2:
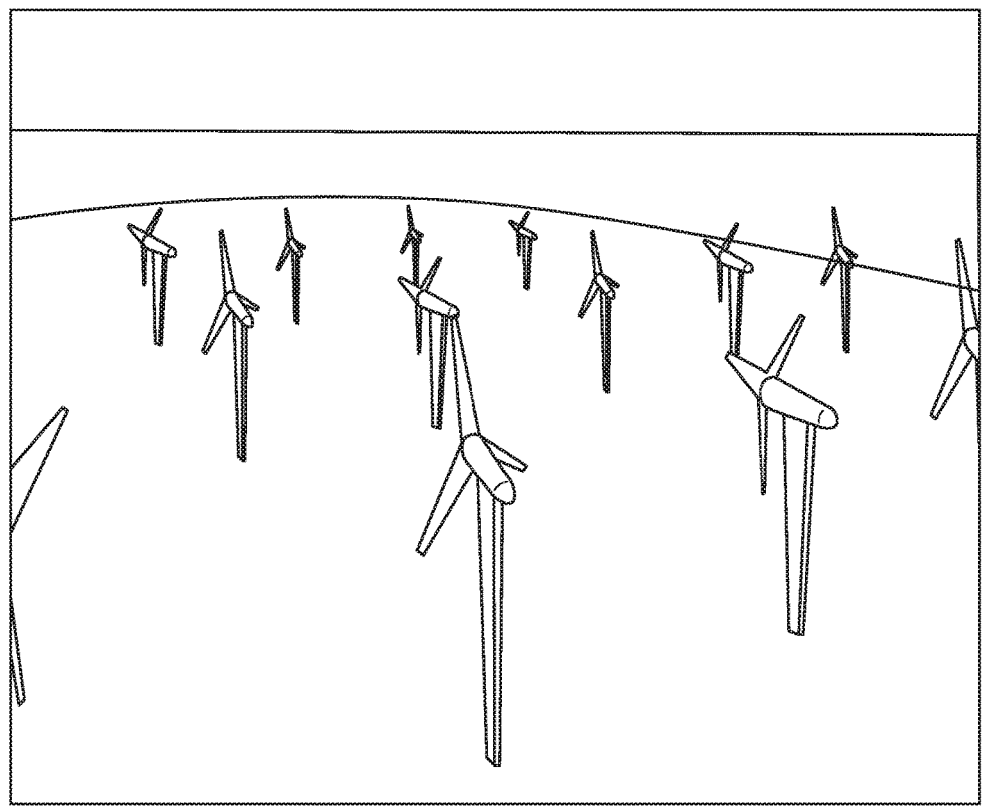
FIG. 2 is a prior art example of a tidal farm.

Referring to FIGS. 3-20B, the present invention generally relates to a cyber-physical method, apparatus, and system for converting kinetic energy from a fluid flow. More particularly, the present invention provides a system for interacting with, manipulating, or engaging a fluid flow to attain one or more optimization objectives.

In one embodiment, and by way of example, the fluid flow 30 may be from water currents, such as tidal flow and rivers, wind, or other types of fluid flows. In particular, the present invention provides the ability to harvest kinetic energy from the fluid flows 30 which have variable strength. In addition, the kinetic energy may be harvested from a bi-direction fluid flow. For example, tidal flow may fluctuate in strength due to rising and falling tides or changing lunar and solar cycles. Of course, the fluid flow may comprise other types of liquids, other than water, or gases, other than air.

The cyber-physical system 10 comprising one or more foil members 20 and a feedback control loop system 28. Cyber-physical systems are physical systems whose mechanical response is augmented by an onboard computer in response to real-time measurements, thus enabling enhanced artificial and even unphysical and intelligent behavior. The cyber-physical system is customized or modified given the host sites using a foil member but with virtual augmentation using the feedback control loop system. The result is that cyber-physical system 10 of the present invention improves fluid power conversion or other optimization objectives discussed in more detail below.

The cyber-physical system 10 utilizes recent advances in unsteady hydrodynamics or aerodynamics, such as enhanced lift due to leading edge vortex shedding, a flow regime that traditional turbines are designed to avoid. By utilizing unsteady hydrodynamics or aerodynamics principles, kinetic energy extraction can be provided across a large number of dynamically tunable characteristics. In particular, there are an infinite number of actuation strokes that the hydrofoil member can execute, and that provides a large parameter space to meet the optimization objectives.

In one embodiment, the foil member 20 is a hydrofoil member, airfoil member, or combination thereof. In one embodiment, the foil member 20 is a wing or paddle, preferably flexible, but also possibly rigid or semi-rigid, configured for the efficient extraction of energy from fluid flow. The foil members configured for one or more degrees of freedom of oscillatory movement within the fluid flow 30. In one embodiment, the two degrees of freedom of the foil members 20 is pitch and plunge.

The foil member 20 is a solid object with a shape such that when placed in a moving fluid at a suitable angle of attack the lift (force generated perpendicular to the fluid flow) is substantially larger than the drag (force generated parallel the fluid flow). If the fluid is a gas, the foil member 20 is called an airfoil member or aerofoil member, and if the fluid is water the foil member 20 is called a hydrofoil.

The foil member 20 generates lift primarily as a result of its shape and angle of attack. When oriented at an optimized angle, the foil member 20 deflects the oncoming fluid 30, resulting in a force on the foil 20 in the direction opposite to the deflection. This force can be resolved into two components: lift and drag. This "turning" of the fluid in the vicinity of the foil creates curved streamlines which results in lower pressure on one side and higher pressure on the other. This pressure difference is accompanied by a velocity difference, via Bernoulli's principle, so the resulting flowfield about the foil member has a higher average velocity on the upper surface than on the lower surface.

The feedback control loop system 28 comprising a sensor system, actuator system, and a controller system. The feedback control loop system 28 configured for optimizing the operation of the foil members 20 for the local environment and flow conditions in real-time to attain one or more optimization objectives. The cyber-physical system 10 uses the feedback control loop system 28 to mimic arbitrary effective physical properties distinct from those inherent to the foil member 20. The system 10 can thus mimic complex, dynamically changing structural behavior (for example time-dependent inertia or negative damping). This allows for modifying the behavior and performance of the hydrofoil in software by modifying the feedback control loop system 28. By changing the effective properties of the feedback control loop system 28, the cyber-physical hardware can optimize the energy capture and adapt to many different operating conditions.

The sensor system is configured for directly or indirectly measuring and monitoring the optimization objective during a predetermined time interval. The predetermined time interval may preferably be continuously but it also maybe intermittently, periodically, or another definition of the predetermined time interval. In one embodiment, the sensor system comprises one or more sensors on the foil member 20 and in the surrounding area to measure and monitor flow conditions. By way of example, the sensors may be motion, force, or other types of sensors for monitoring and measuring the foil members 20. The sensor system is configured to determine the energy extracted by monitoring and measuring the foil members degrees of freedom of motion and its conjugate forces. More specifically, the sensors measure the pitch and plunge kinematics, and the force and torque acting on the foil members.

The sensor system is connected to the foil members 20. In one embodiment, the sensor system is integrated, attached, incorporated, or embedded in whole, or in part, within the foil members 20. Also, the sensor system may incorporate the adjoint method.

The actuator system is operationally connected to the foil members 20. In one embodiment, the actuator system includes an electric motor/generator 22 operationally connected to the controller system and an actuator arm connected to the hydrofoil member 20, and a shaft 24 connected to the motor/generator 22 and the hydrofoil member 20. The actuator arm, in one embodiment, is a wing or other shape connected to the hydrofoil member 20 and the motor/generator 22. The wing, in one embodiment, may further contain therein a shaft rotatably connected to the hydrofoil member 20 and the electric motor/generator 22 to facilitate production of electricity.

Motor/generators 22, 27 are capable of running in two opposite modes. The shaft usually spins the same way. The "change of direction" is in the flow of electricity. As a motor it consumes electricity (flows in) to make mechanical power, and as a generator, it consumes mechanical power to produce electricity (flows out). Motor action (supplying mechanical power) is in essence the reverse of generator action. Instead of spinning the armature to make electricity, current is fed by a circuit, through the brushes and slip rings and into the armature. This current flowing through the coil wound rotor (armature) turns it into an electromagnet. The permanent magnets in the stator repel this electromagnetic force causing the armature to spin. As long as electricity flows through the circuit, the motor will run. Of course, the actuator system may include a motor and generate that are separate.

The actuator system is configured to manipulate the degrees of freedom of motion of the foil members 20. For example, the actuator system may adjust the pitch angle of the foil member 20. In one embodiment, the actuator system is attached or connected to the foil member 20. In addition, the actuator system is configured to submerge the foil member 20 near or on a bed of a body of water when inactive.

The controller system is operationally connected to the sensor system to receive the sensor data and the actuator system to manipulate the foil members 20. The controller system is operated by an optimization algorithm utilizing the sensor data. The optimization algorithm is designed to run autonomously, constantly adjusting the cyber-physical actuation for the changing flow conditions to maximize energy capture, with minimal supervisory input.

The controller system is configured for instructing the actuator system to manipulate the foil members to attain one or more optimization objectives. The controller system instructs the actuator system to provide a periodic motion of the foil member to measure and determine the motion of the foil that maximizes the extracted power, potentially sacrificing some energy intermittently to gain even more than was sacrificed in a single stroke of the foil member.

The controller system or the feedback control loop system 28 may include a computer and software for calculating the algorithm with input from the sensor data and instructing the actuator system to manipulate the foil member 20, especially with regard to optimizing the stroke (FIGS. 6-7) of the foil member 20. In addition, embodiments of the controller may also include one or a multitude of internet based servers, and computer software, including internet web page based code, and methods of application for providing the user with an internet based service. Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", or "system". Furthermore, aspects of the present invention may take the form of a computer program product embodied in one or more computer readable medium(s) having computer readable program code embodied thereon.

The motion of the foil member 20 is controlled using actuators (i.e. the shaft 24) by the real-time controller 28. The actuator is reversible, i.e. it is capable of bidirectional conversion between electric energy and mechanical energy. With the suitable control algorithm, the net flow of power is out of the system (energy harvesting). Although the control may be open-loop in which the motion is pre-determined, perhaps with some adaptive quality, the true versatility of this methodology is revealed when the feedback loop is closed in which new dynamics and real-time optimization is possible. The variety of the hardware hydrofoil member, the degrees of freedom it has, the array of sensors and the control algorithms makes the cyber-physical system easily customizable.

Figure 3:
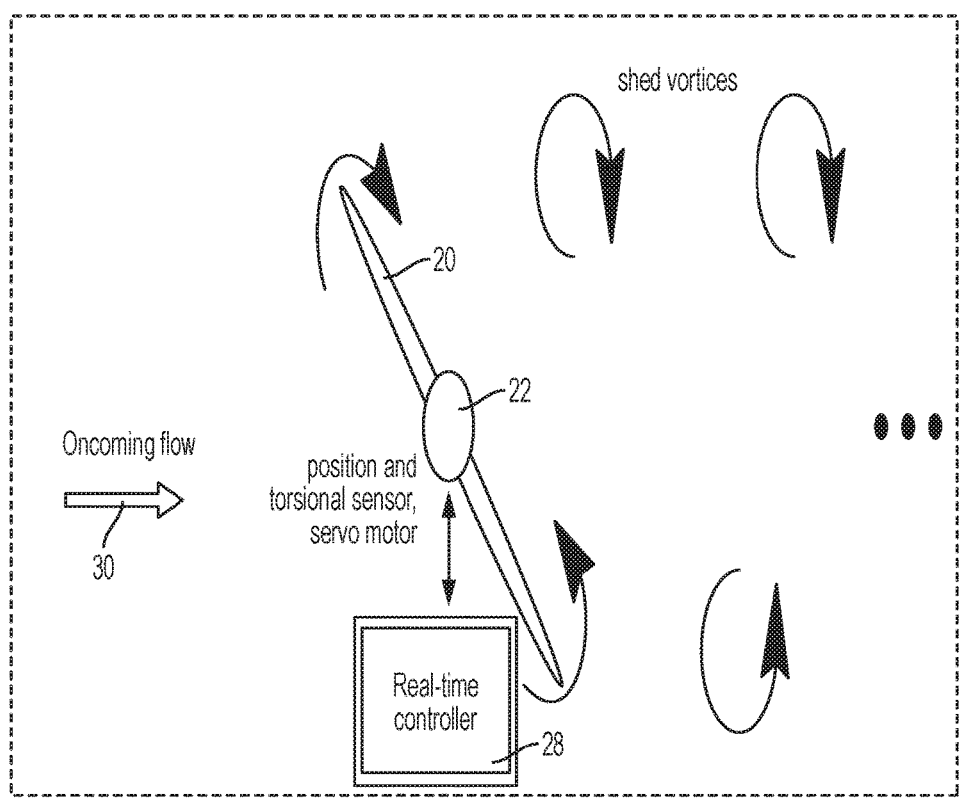
FIG. 3 is a schematic view of a system having oscillating hydrofoil members.

As an example, consider installing motion sensors to measure the linear and angular displacement and accelerations of the foil member 20, as schematically shown in FIG. 3. Linear and angular actuators exert force and torque of the hydrofoil 20 depending on the instantaneous displacement and acceleration. This actuation is implemented so as to simulate specific values for the system mass and its supporting spring, i.e. we create a virtual oscillating structure. These parameters could be fixed, but could also be time-dependent, nonlinear even negative. These parameters are modified in real time depending on the prediction of the tidal currents or on the flow speeds measured in real time. A real-time optimization algorithm may be implemented to seek the virtual parameters for maximum power conversion. In this mode, the same physical hardware may be installed in different sites with different flow speed and depth, and the software will adapt itself to the site for maximum power conversion. When an array of such devices in deployed in a farm, each device will optimize its own operation in collaboration with its neighbors. Synchronized motion of the devices on the scale of the farm can be used to control the global scale flow. As the computational and communication ability of the onboard controller grows, optimization of more variables describing virtual coupling between the devices can be used to link them and mimic a large-scale device. Such a coupled system may be capable of controlling and constraining large-scale flow modifications.

The transient actuation of the foil member 20 allows it to exploit unsteady fluid dynamic effects such as unsteady leading edge separation, vortex recapture, and dynamic stall to surpass the performance dictated by steady fluid dynamics.

One of the primary advantages of the cyber-physical system 10 over static designs, like turbines, is the cyber-physical system 10 adapts itself to the flow environment and conditions in real-time and thereby needs minimal site-dependent design and customization. Moreover, the optimization of the cyber-physical system 10 ensures the energy conversion performance, in terms of a power coefficient, is the maximum possible for the site and instantaneous flow conditions. The cyber-physical system 10 is less sensitive to modeling uncertainties and perturbations and more tolerant towards widely different and dynamically varying circumstances.

Other advantages of the cyber-physical system 10 over existing tidal turbines are:
(a) the system 10 operates seamlessly in streams that reverse direction;
(b) the system 10 has the potential to have high energy capture efficiency further improved by real-time active tuning to account for changing currents;
(c) the system 10 has a high aspect ratio configuration which is well suited for deployment in river systems; and
(d) the system 10 has no major rotating components, and thus might have a lower impact on aquatic ecology than conventional tidal turbines.

In one embodiment, the controller system comprises a computer and software for automatically manipulating the foil members to attain the one or more optimization objectives.

A first optimization objective is optimization of energy extraction from the fluid flow. A one-time cost of implementing a feedback control loop system 28 using the appropriate sensors can also eliminate the need for a site-specific actuation programming. The first optimization objective involves an optimization algorithm which automatically finds the optimal actuation stroke depending upon the current local conditions. For example, an algorithm is used to identify the optimal stroke is to measure the extracted power in real time as a function of the stroke and use a deterministic algorithm like gradient-descent or a stochastic algorithm like simulated annealing to maximize the extracted power. This possibility recovers the recurring manual cost per installation of developing the optimum actuation stroke and makes the device site-agnostic to an extent.

This method of optimizing the stroke is also far less sensitive to measurement and model uncertainties. For example, when multiple such devices are deployed in vicinity of each other, the modified stroke need not be recomputed but the real-time optimization algorithm automatically accounts for the altered flow and perhaps even synchronizes the strokes for maximum energy conversion, without any manual intervention. Our estimate of the available tidal resource is based on the implicit assumption that turbines are the only mechanism for power conversion, because these estimates identify sites appropriate for installation of turbines. In fact, these cyber-physical systems can work with weaker or stronger flow, shallower or deeper sites and thus alter our estimate of the tidal power resource.

A second optimization objective is the manipulation of a quantifiable effect downstream of the foil member to attain modified turbulence, mixing, or sediment deposition. The system of the present invention is ecologically safe, especially to aquatic life, which facilitates more widespread deployment, especially in more populated areas, and requires less environmental mitigation—which further lowers the costs of operation.

The cyber-physical system 10 may also be used to deploy a tidal power farm. Cyber-physical coupling between neighboring devices can be used to give rise to global oscillation patterns in the farm. Synchronization of the devices thus allows the farm to mimic the operation of one large-scale device. This global oscillation pattern can be used to control the large-scale flow modifications. Every tidal farm extracts energy from the flow, and thus slows down the fluid in the wake. Typically, turbines and oscillating foils also add vorticity and turbulence in its wake, although there is no fundamental fluid mechanical reason for this turbulence.

In an ideal energy conversion mechanism, the flow speed is reduced and turbulence is minimized. The effect of the tidal farm could be to cause the suspended material in the flow to sediment because of the reduced flow speed or to be resuspended because of the turbulence. It appears that there is no fundamental reason why a tradeoff could not be struck by maintaining the same level of nutrient, sediment and gamete mixing by increasing the turbulence the right amount while extracting energy from the flow. If the amount of mixing in the natural habitats is measured, the optimal control algorithm implemented on the scale of the farm can minimize the departure from natural transport. Mathematically, the optimization for maximum power conversion will need to be performed under the additional constraint of maintaining the current levels of mixing while maximizing the energy extracted. The optimization algorithm onboard these devices can be changed to reflect such constraints and thereby alter their performance. Based upon information and belief, this system is the only one that attempts to address the influence of tidal power conversion on the environment.

A third optimization objective is to regulate the force on multiple foil members to minimize drag or maximize thrust using minimum energy expenditure.

It should be noted that the one or more optimization objectives or the optimization algorithm are configured to be updated or modified. Moreover, improvements are possible in software by updating the optimization objective or algorithms, and that possibility provides a mechanism for improving performance at minimal costs. In addition, the cyber-physical system or its software may be adapted to existing prior art systems.

Additional components or elements may be added to enhance the operation of the system 10. To provide stability to the system 10, one or more support mechanisms 26 may be connected to the actuator system. The support mechanism 26 may be a frame or other structural support attached, connected, or other means known in the art to a sea bed or river bed, land, piles, foundations, or other objects to provide stability and support. The support mechanism 26 may also be a frame or other structural support configured to float and stabilized by cables or other fastening means. The support mechanism 26 provides a fixed location for the hydrofoil member 20 and feedback control loop system 28 and supports the cyber-physical system 10 in its position of usage. Alternatively, the support mechanism 26 may maintain its fixed location through the effect of gravity on the cyber-physical system 10 acting through the support mechanism 26.

A means for extracting kinetic energy from the oscillatory movement of the one or more foil members 20 may be provided. In one embodiment, the oscillatory movement is converted to electricity using a motor/generator 22 operationally connected to the one or more foil members 20. Of course, the kinetic energy may be converted to other types of energy than electricity or may be used in extracting other types of energy.

A linking means may be provided for allowing the foil members 20 to oscillate within the fluid flow 30. In one embodiment, the linking means is a one or more gear mechanisms connected between the hydrofoil members 20 and the actuator system. In one embodiment, the gear mechanism connects the hydrofoil member 20 to a shaft 24 of the actuator system for connecting to the electric motor/generator 27 for producing electricity.

Also, the foil members 20 may be arranged in a cluster or farm. The optimal control algorithm synchronizes the strokes of the foils to mimic to mimic operation of a monolithic large scale structure, which cooperatively extracts the maximum possible energy from the flow on the global scale.

The principle of operation of the oscillating foil members 20 is linear motion rather than rotational blade motion. The orientation of the hydrofoil member 20 relative to the fluid flow, called the hydrofoil pitch, is dynamically adjusted by the feedback control loop system 28 so that oncoming flow 30 pushes the hydrofoil member 20 downwards on a down stroke and upwards on an upward stroke. The hydrofoil member 20 pitch is actively controlled using the feedback control loop system 28 with an optimization algorithm, with particular focus on maintaining quasi-steady dynamics over the foil member 20. The appropriate tuning of the oscillating hydrofoil members 20 using the feedback control loop system 28 is central to the cyber-physical energy extraction system 10 of the present invention.

Oscillating hydrofoils have many advantages over turbines in terms of site adaptability and large-scale deployment. Although turbines also employ a streamlined geometry, the blade rotation means that the efficiency varies from the root to tip due to the change in local fluid velocity. In contrast, all locations on an oscillating hydrofoil move at the same speed and hence achieve uniform optimal efficiency. Tip losses in rotary turbines significantly reduce their performance, while a foil member can be expanded by installing another foil member adjoining it, and the tip effects can be consolidated or even captured akin to the mechanism achieved in the V-shaped flight formations of migratory birds. Turbines prohibit close placement due to hydrodynamic interference. Conversely, a long foil member can be broken up into smaller hydrofoils sections attached to less powerful actuator-motor/generator unit to suit other design constraints without any loss in hydrodynamic efficiency. The linear nature of the oscillating hydrofoil is also more suitable for installation in the shallow and wide geometries of rivers and estuaries. Lastly, while the turbine geometry permanently blocks the waterway, a hydrofoil can be stopped and stored near the bed so as to give way to passing ships. For all these reasons, the system of the present invention has many advantages.

The present invention relies on hydro-elastic instabilities and actuate, not only the pitch of the foil member 20, but also other degrees of freedom in order to exploit unsteady hydrodynamic effects such as vortex shedding. Coupled with a suitable array of sensors, the foil member 20 transforms in to a cyber-physical system in which we can optimize the response of the system so that it is capable of extracting energy over a wide range of operating conditions while still able to meet other constraints such as tidal farm optimization and environmental impact.

Referring to FIGS. 8-17, in operation, the foil members 20 are situated or immersed in the fluid flow 30 and are manipulated automatically to attain one or more optimization objectives in real-time operation. The foil members 20 may be manipulated automatically manually, or a combination thereof. The foil member 20 is tilted downwards on a down stroke and upwards on an up stroke. As a result, the hydrodynamic force on the foil member 20 points in the direction of the motion, and the flow does mechanical work on the foil member 20, which may be used to drive a motor/generator 22, 27 of the actuator system.

The hydrofoil member 20 is operating along a horizontal axis and the actuator arm (in this case, the shaft 24) is oriented along a vertical axis, however, the hydrofoil member 20 may also be alternatively be configured to operate along a vertical axis and the actuator arm 24 may be oriented along a horizontal axis. It should be noted that the kinetic energy of the actuator arm 24 may also be capture by connecting the actuator arm 24 to a motor/generator 22, 27. Also, it should be noted that the system 10 may be operated in realtime, near realtime, non-realtime, or another time period.

Figure 18:
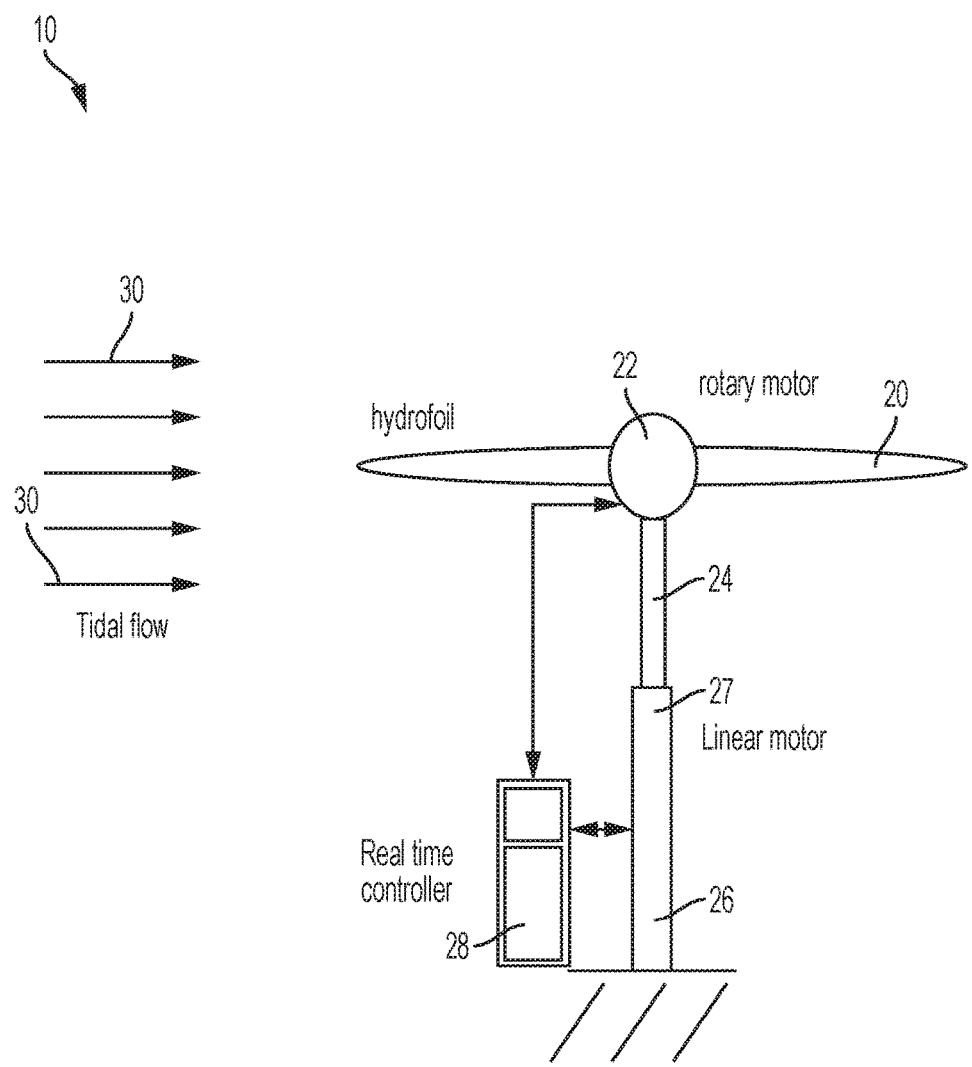
FIGS. 18-19 illustrate another embodiment of the cyber-physical system.
Figure 19:
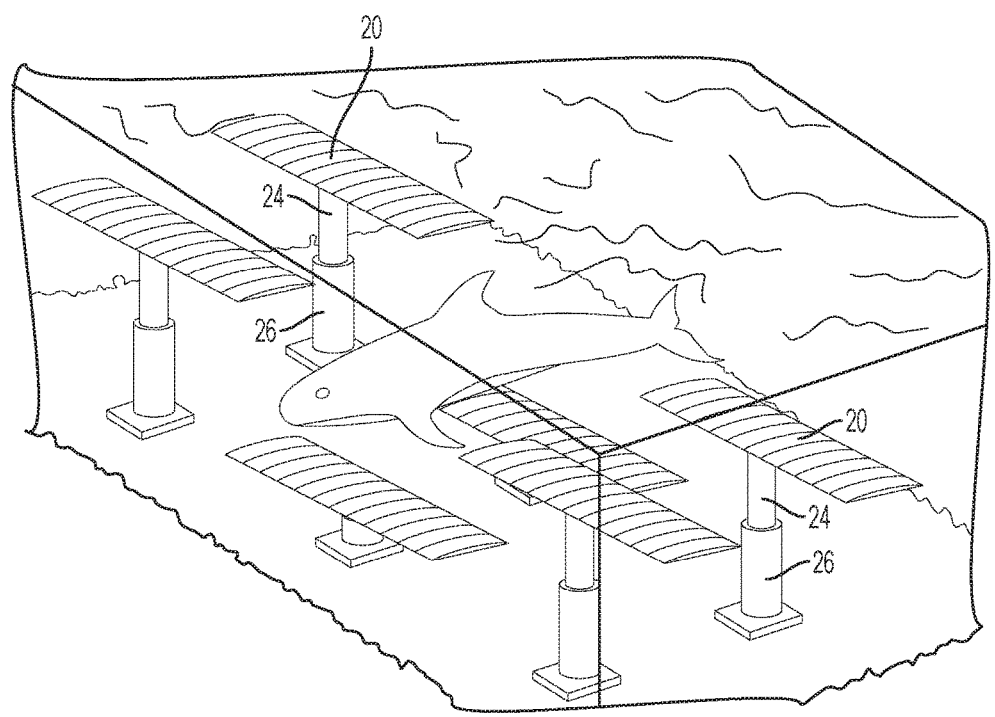

Referring to FIGS. 18-19, in another embodiment, the foil members 20 are situated or immersed in the fluid flow 30 and are manipulated automatically to attain one or more optimization objectives in real-time operation. In this embodiment, the hydrofoil member 20 is operating along a horizontal axis and the actuator arm 24 is oriented along a vertical axis, however, the actuator arm 24 and support mechanism 26 is attached to seabed floor 32.

Also, a method is provided for interacting with and manipulating a fluid flow 30 using the system 10 above. The method comprises providing one or more foil members 20 configured for one or more degrees of freedom of oscillatory movement within the fluid flow 30. The foil members 20 operating to oscillate within the fluid flow 30. The operation of the foil members 30 are optimized to attain one or more optimization objectives using a feedback control loop system 28. In operation, the foil members 20 are situated in the fluid flow 30 and are manipulated to attain one or more optimization objectives. The cyber-physical system hardware installations can be tuned in real-time by the software to optimize the performance, and thus lead to improved price to performance ratio, economy of scale in manufacturing, cooperative behavior across tidal farms, and upgrades at low unit cost.

Experiment I

Figure 4:
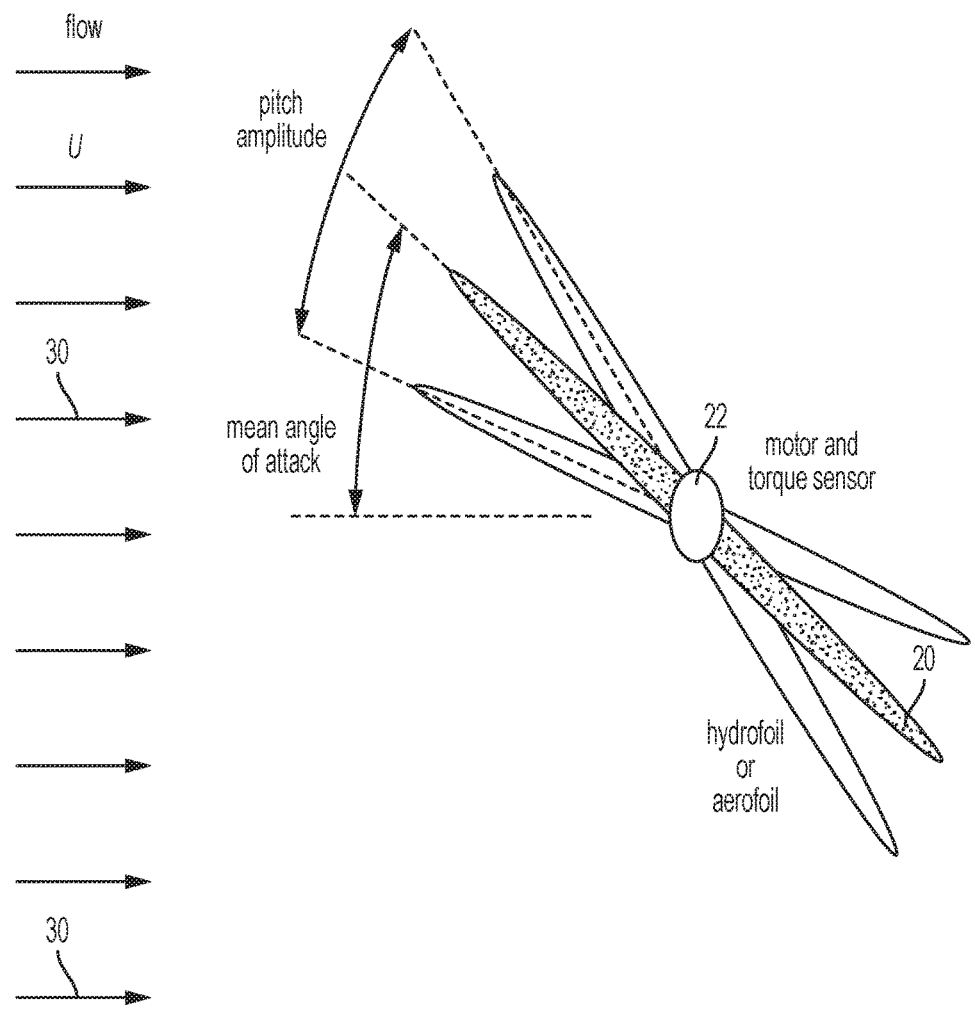
FIG. 4 is another schematic view of the system having oscillating hydrofoil members.
Figure 5:
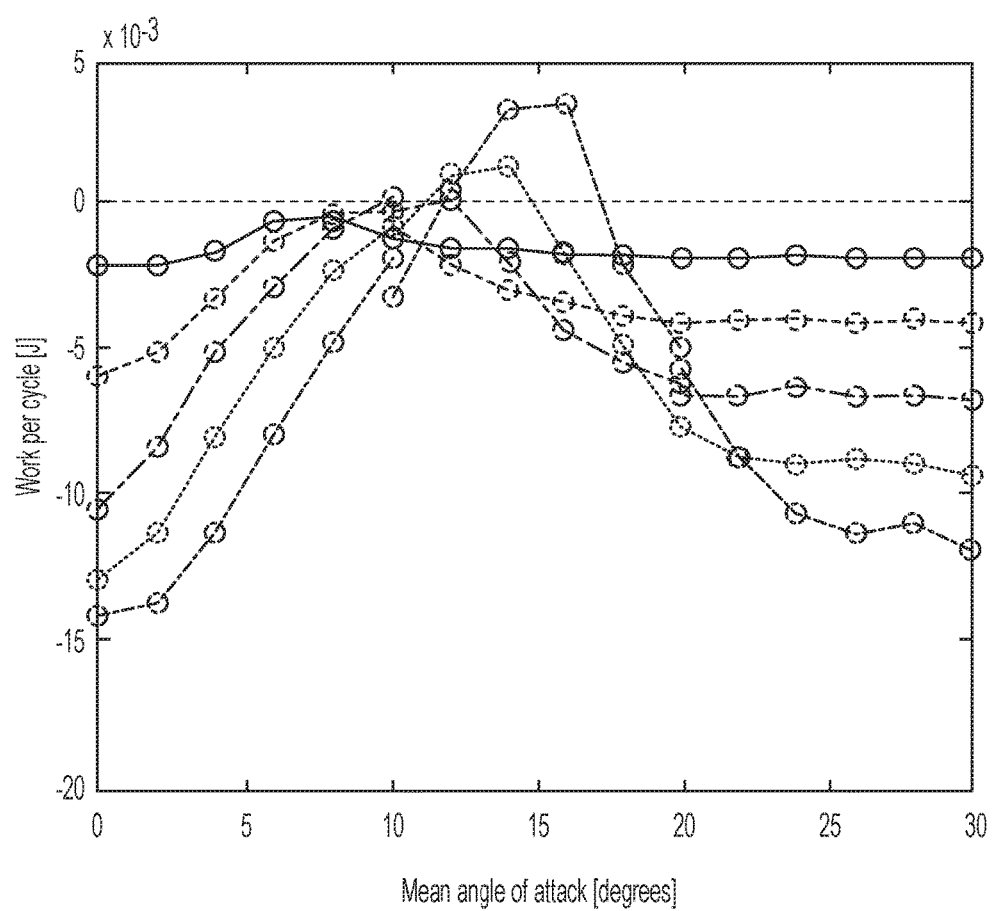
FIG. 5 is a graph showing data from a system of FIG. 3.
Figure 6:
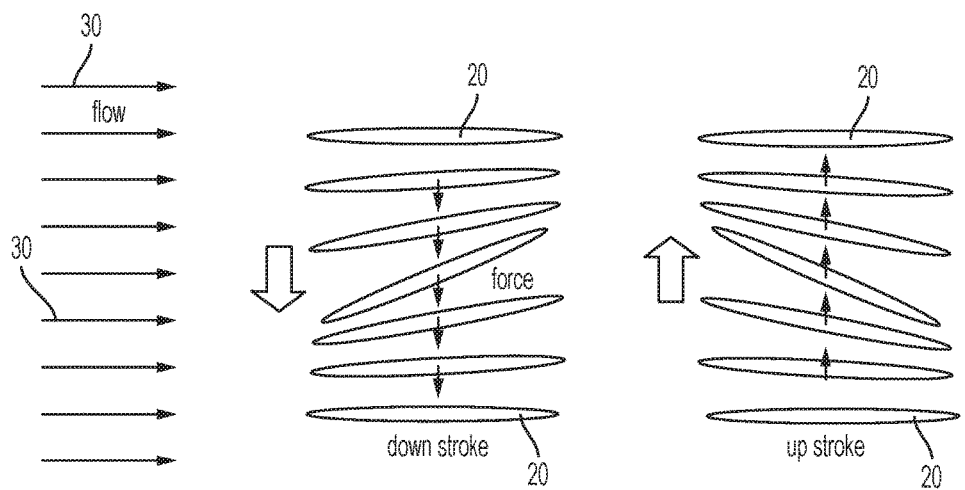
FIG. 6 is a schematic demonstrating the operation behind power conversion by oscillating hydrofoil members.
Figure 7:
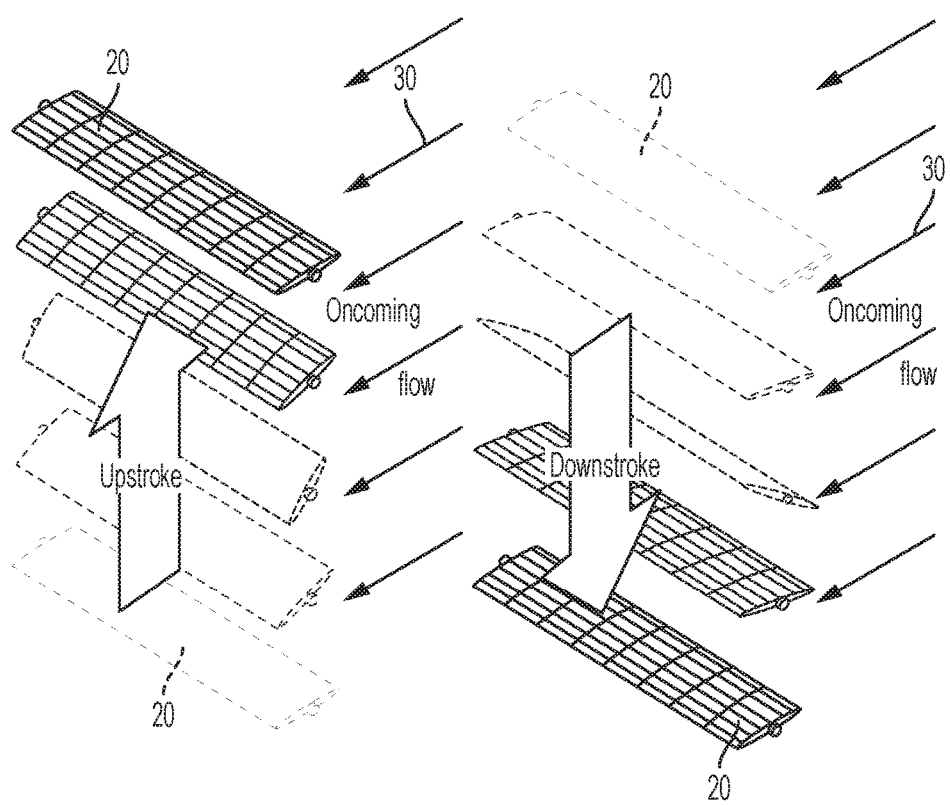
FIG. 7 is another schematic demonstrating the operation behind power conversion by oscillating hydrofoil members.
Figure 8:
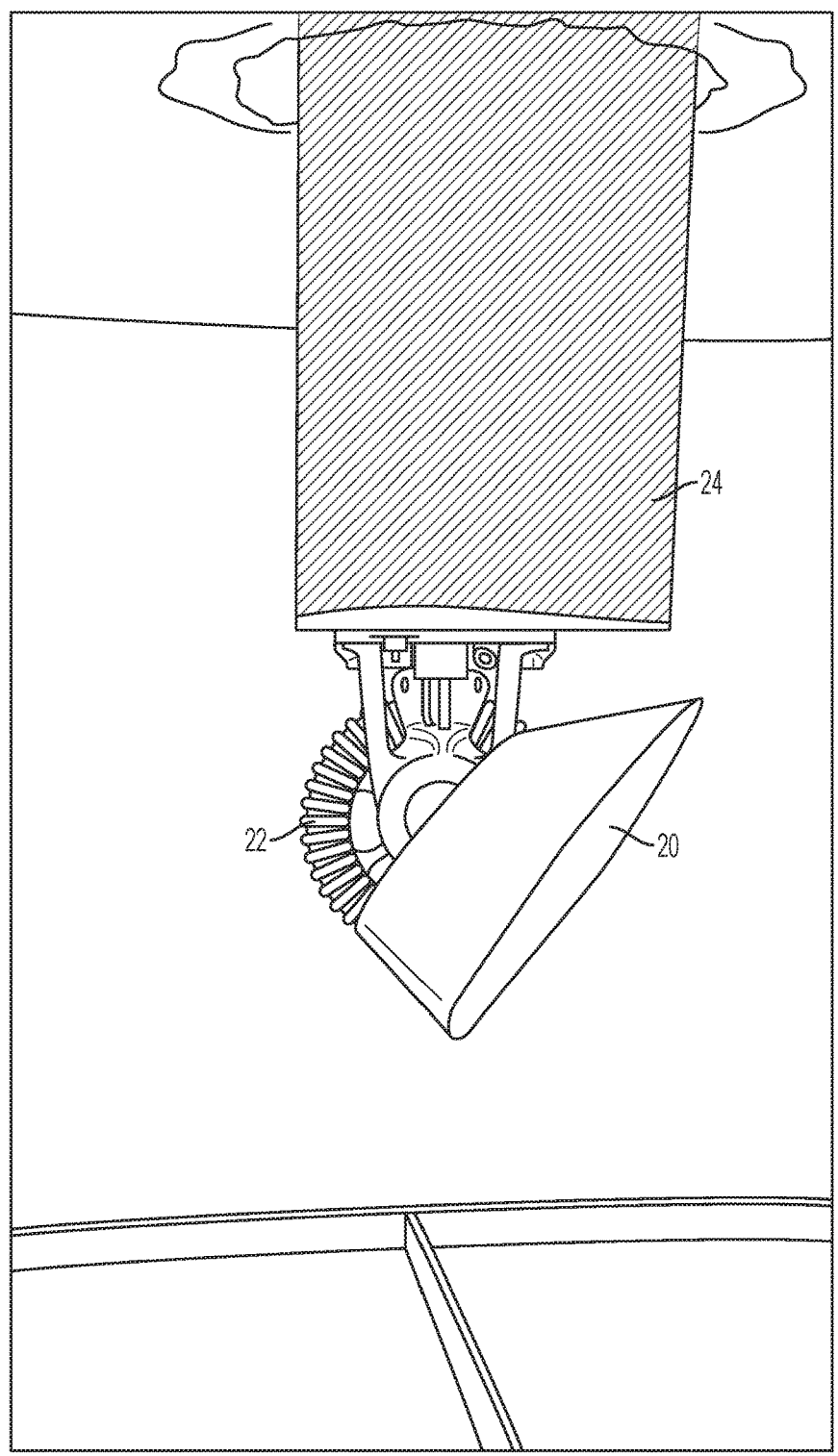
FIGS. 8-17 illustrate a series of views of an embodiment of the cyber-physical system during operation with a fluid flow.
Figure 9:
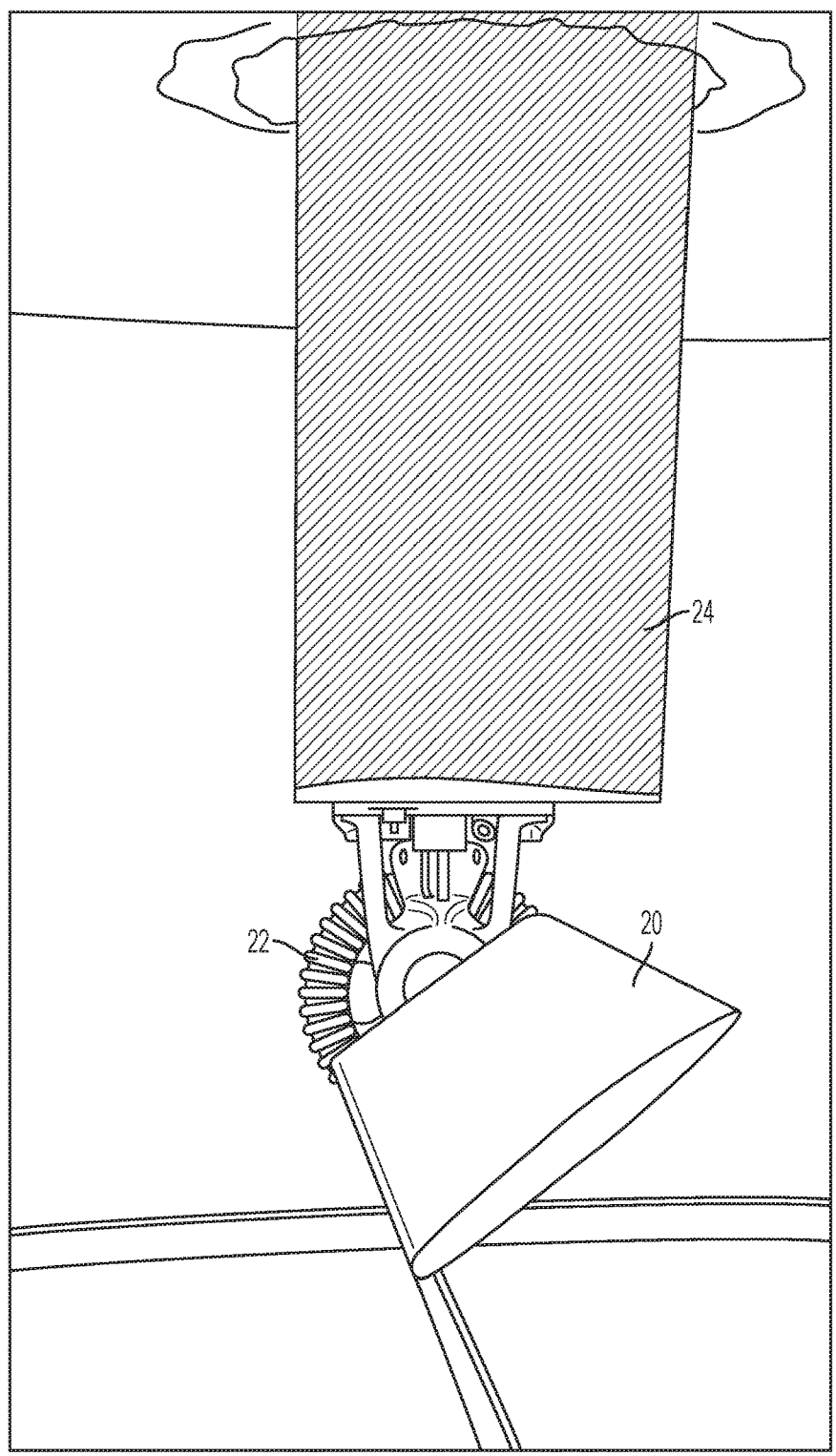
Figure 10:
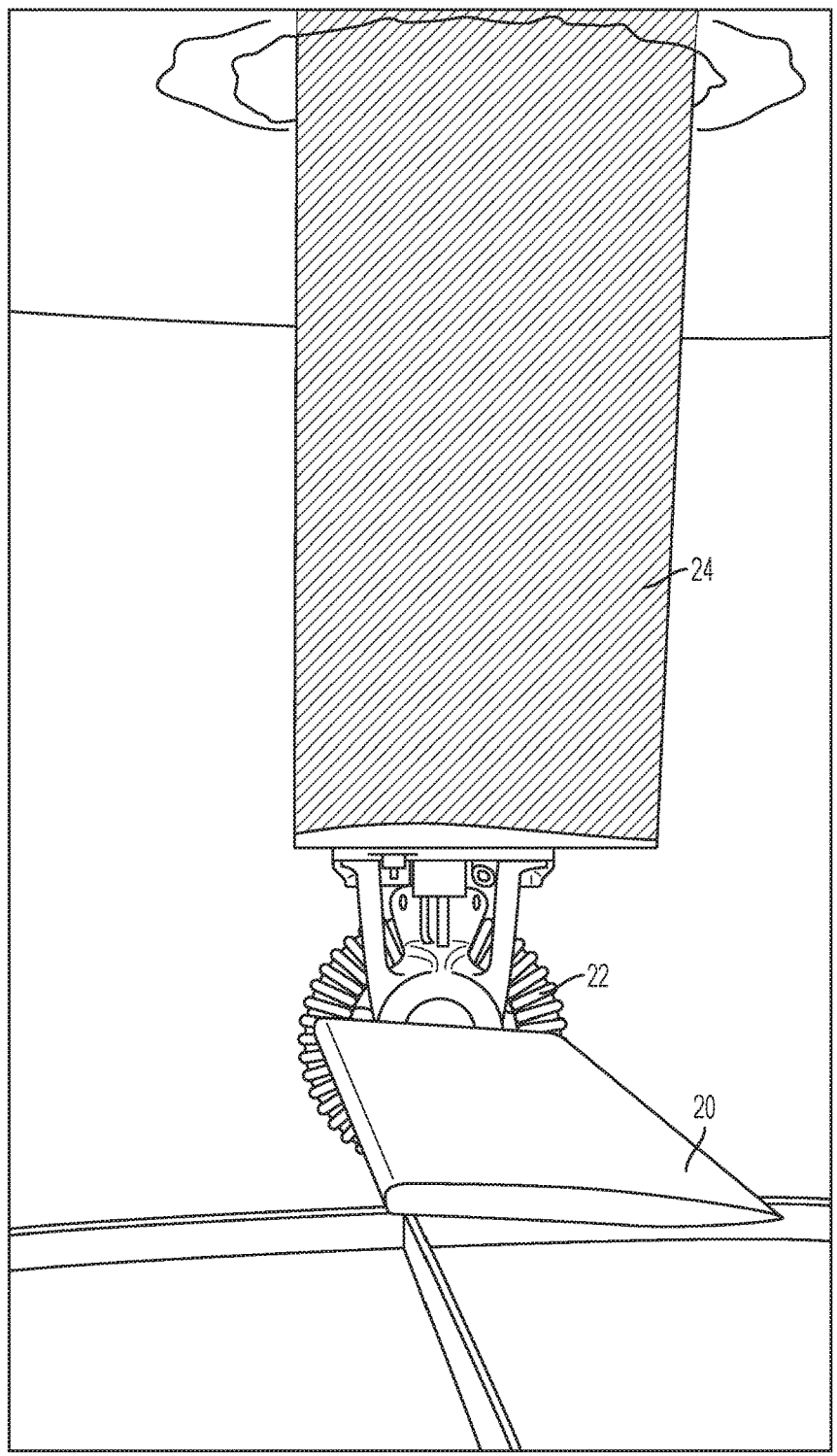
Figure 11:
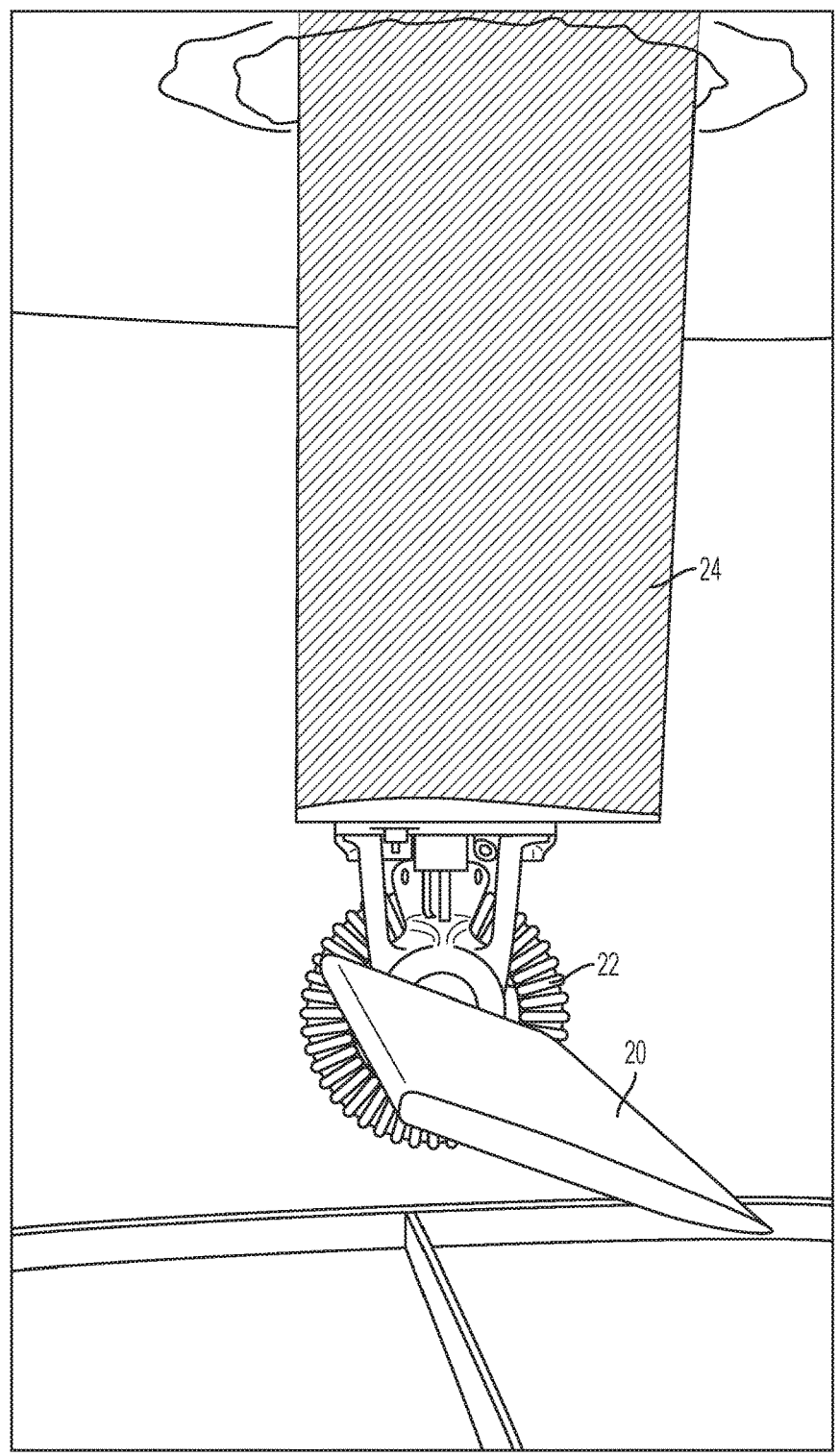
Figure 12:
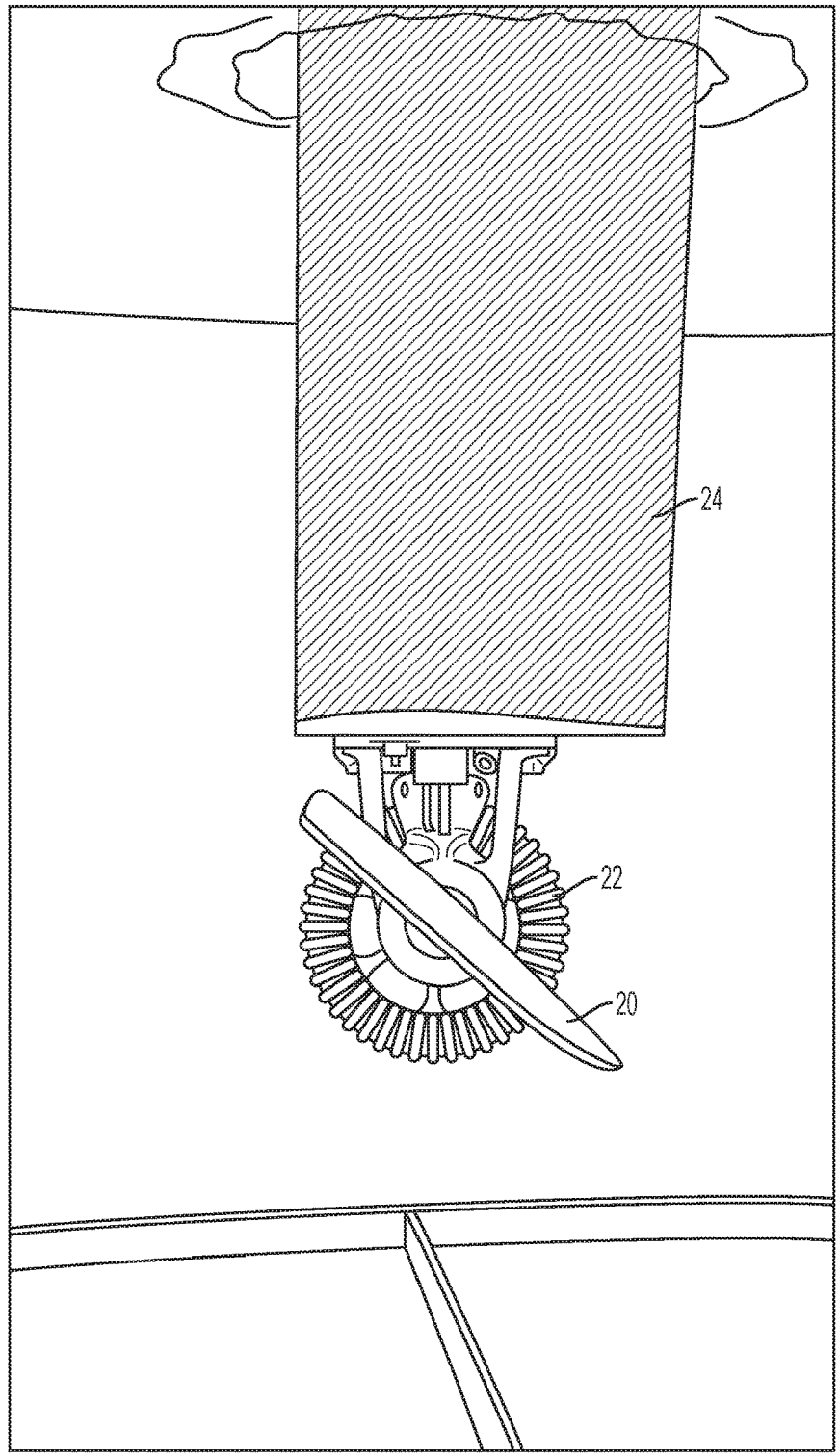
Figure 13:
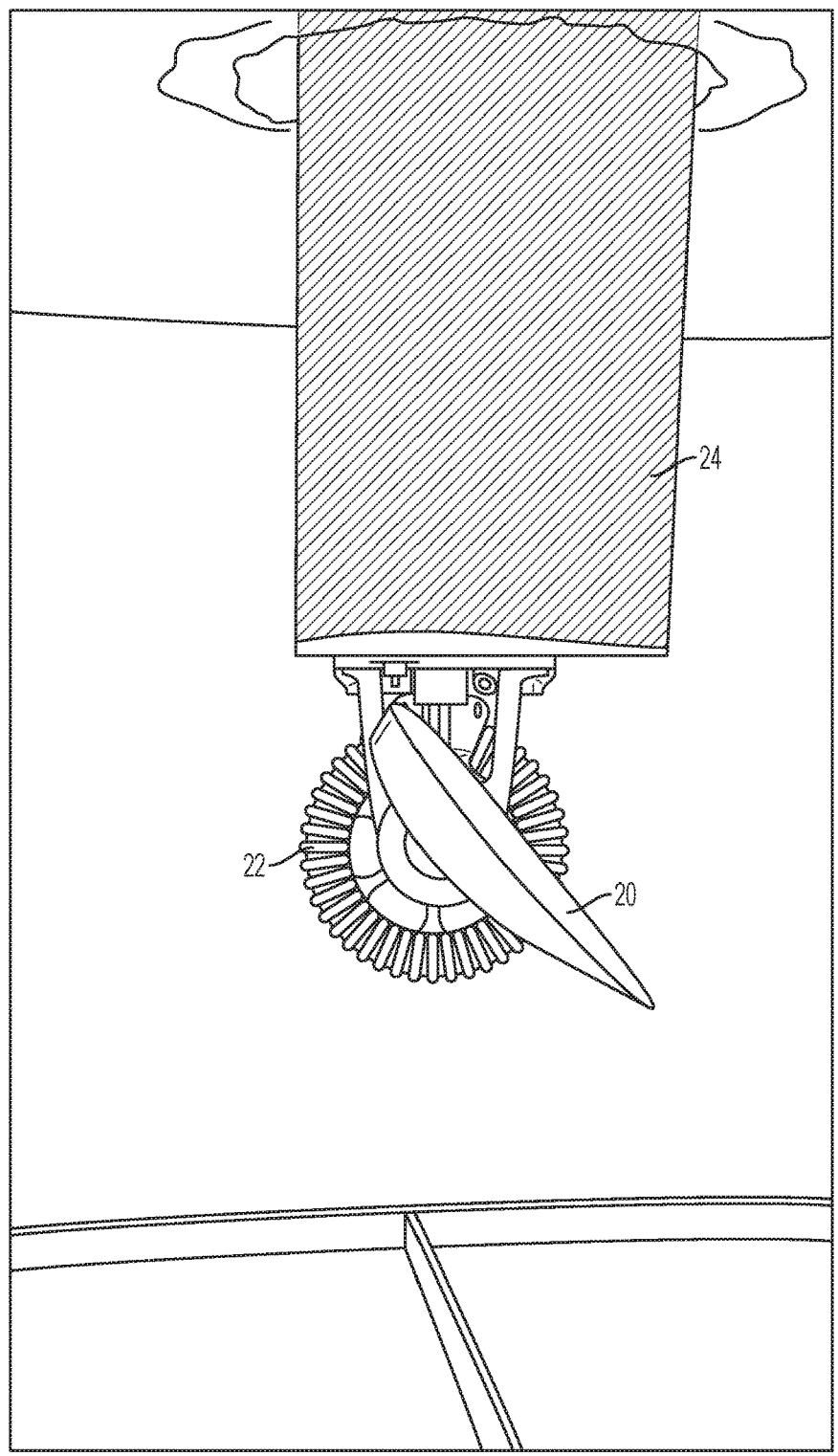
Figure 14:
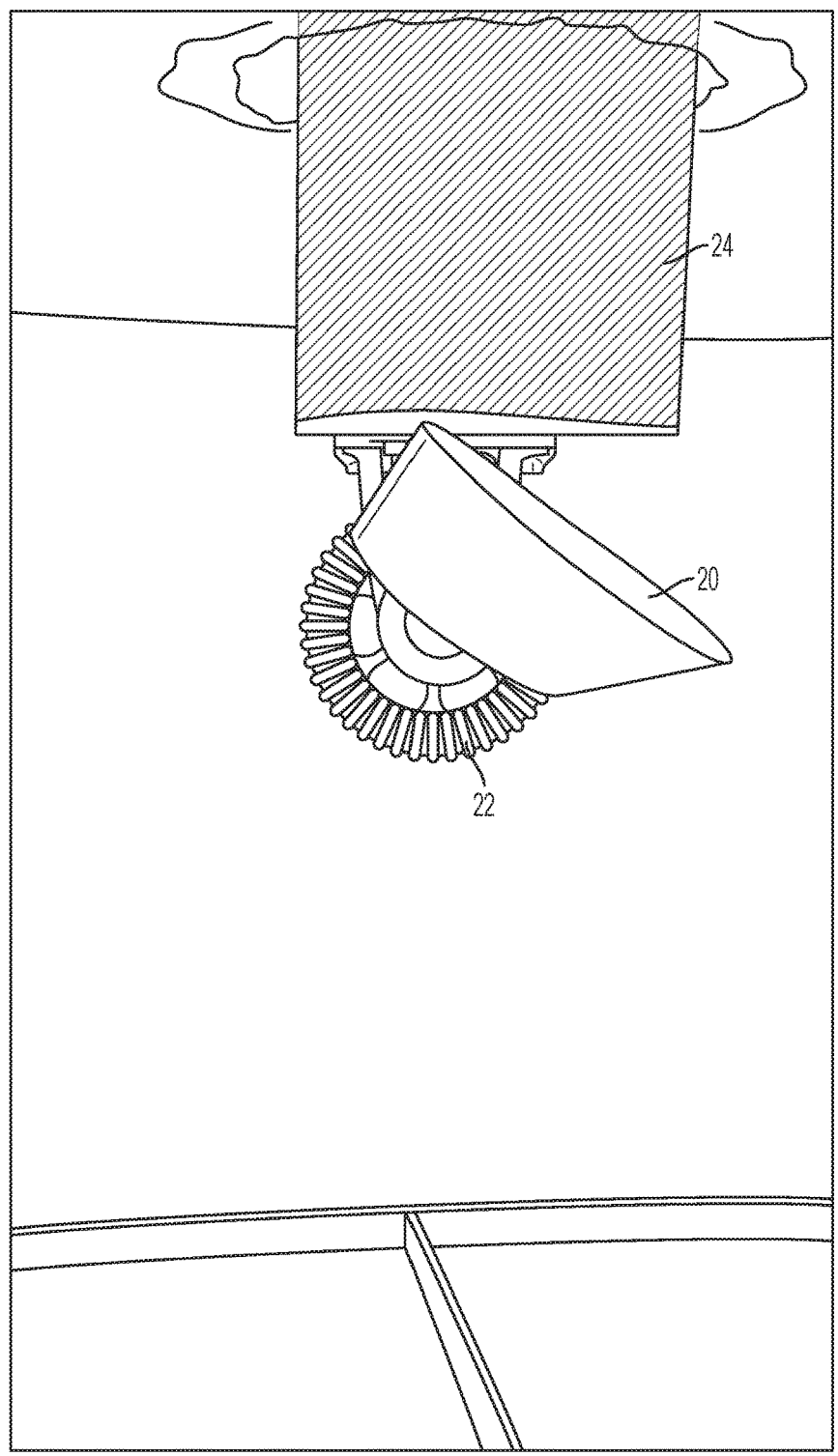
Figure 15:
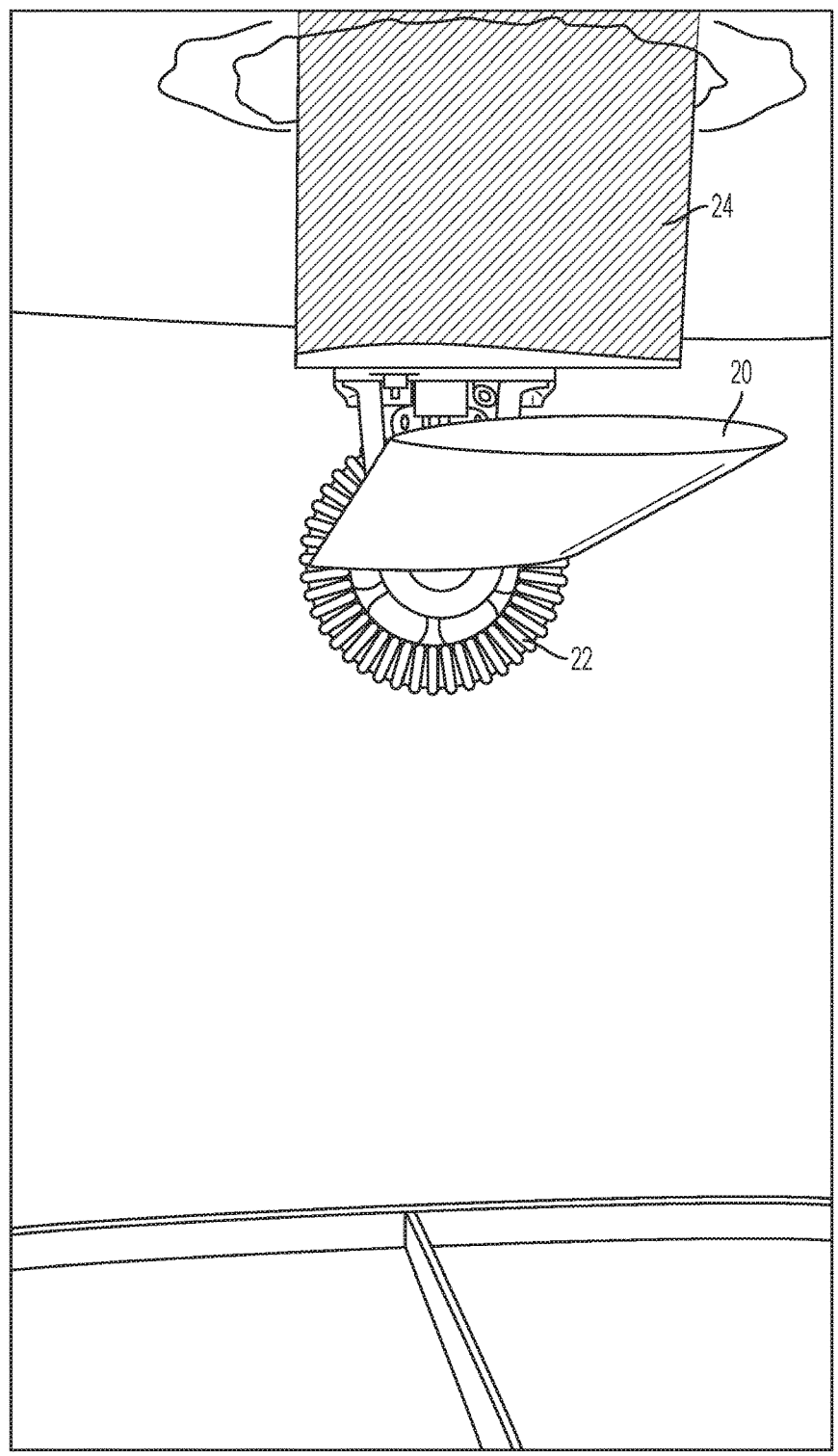
Figure 16:
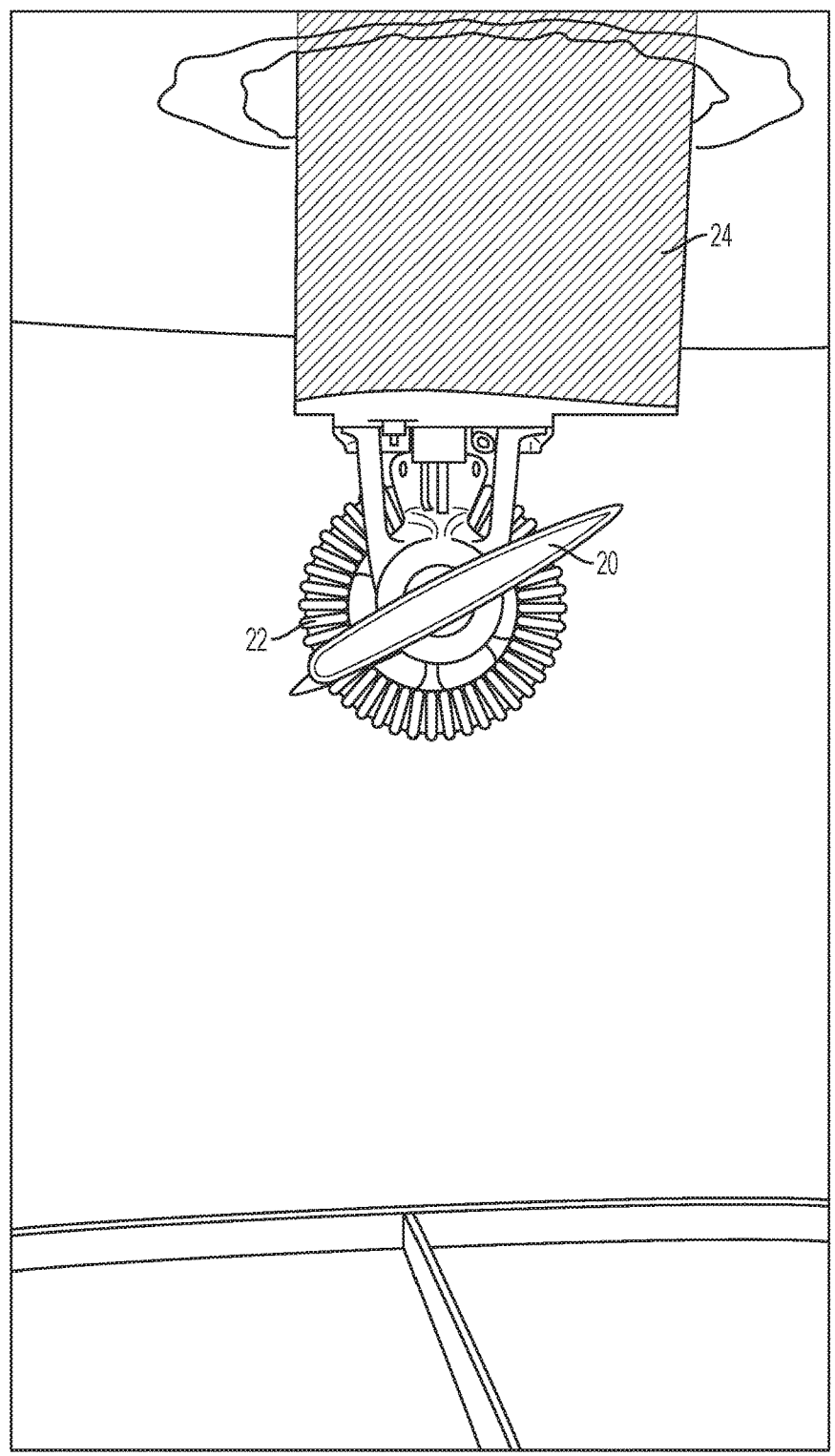
Figure 17:
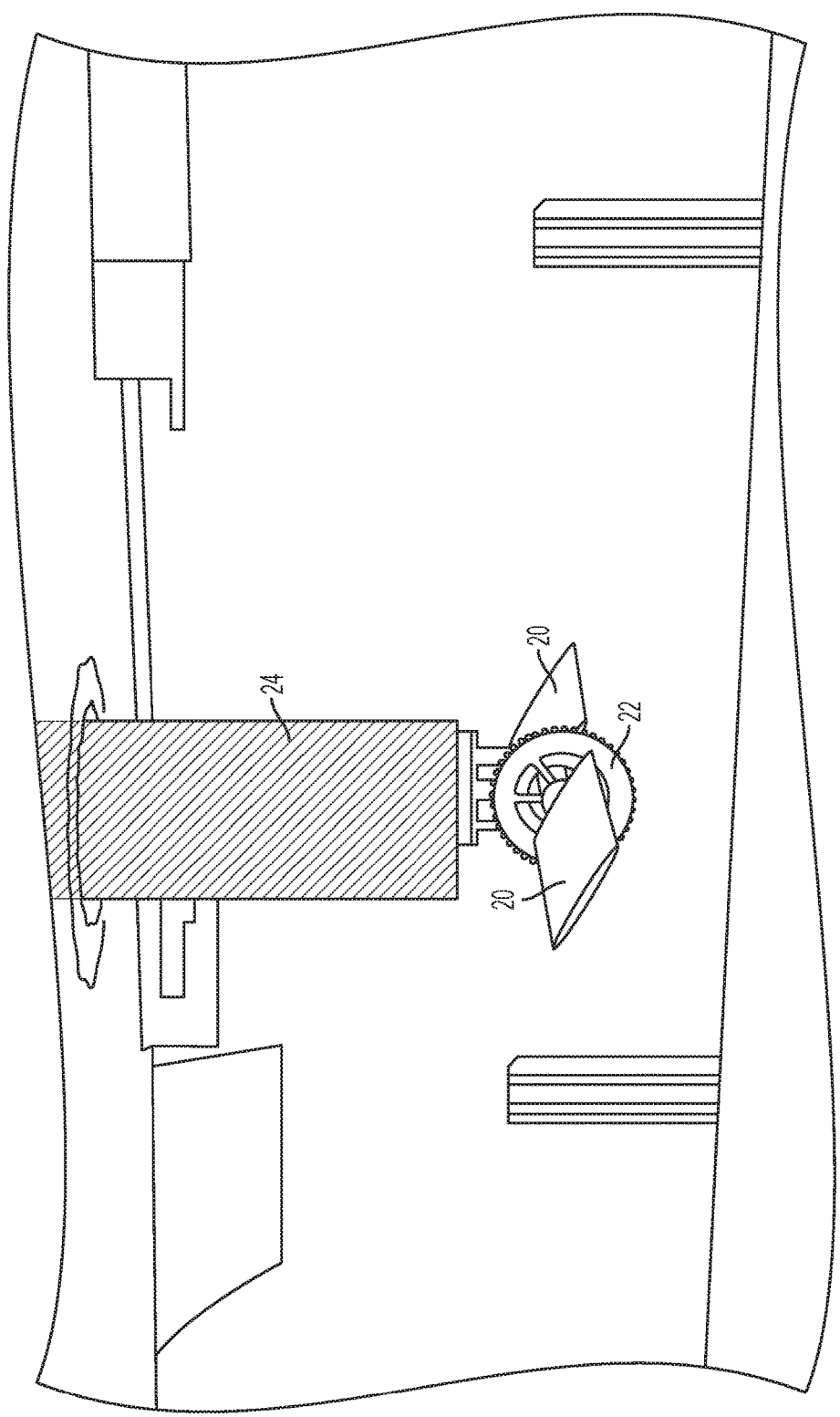

Referring to FIGS. 3-5, an experiment was conducted in a laboratory, more specifically a wind tunnel, to provide evidence of the optimized operation of the foil members 20 situated in the fluid flow 30 to attain one or more optimization objectives. Referring to FIG. 3, a system for kinetic energy conversion is provided. The system comprises a rigid wing or foil member 20 was operationally connected to a feedback control loop system 28 having an electric motor/generator or servo motors 22 which controls and manipulates pitch angle. Sensors are embedded within the foil member 20 to measure the angular displacement of the wing and the pitching torque exterted by the fluid on the foil member. The feedback control loop system 28 monitors the displacement and applies a restoring torque proportional to the angular displacement, thus imitating a torsional spring. The spring constant of this spring can be tuned in software, and this manner optimized for different flow conditions. Furthermore, by monitoring the torque and incorporating this into the control algorithm, the effective inertia of the foil member can be electronically varied, creating a virtual structure that can be dynamically tuned. A real-time controller monitors the position and forces on the foil member 20 and maintains the system dynamics so that energy harvesting is accomplished at maximum efficiency. Note, the symmetry of the system allows it to operate without any re-configuration if the fluid stream changes direction.

In both the air and water testing facilities, the setup consists of a thin symmetric airfoil (or hydrofoil) mounted with two degrees of freedom (pitch and plunge) and actuated using servo motors controlled by a real-time digital controller. Different air/hydrofoils will be used, with chord length varying between 2-5 cm and span ranging between 30-50 cm. This allows for different environments and parameter. The control will be implemented using a commercial real-time controller programmed via a MATLAB-SIMULINK interface. Typical flow speeds in the wind tunnel are 1-20 m/s, while the water channel is capable of 0.1-2 m/s. This configuration corresponds to a flow Reynolds number ranging from approximately 2000 to 50000, with an estimated power output of 1-5 W in both air and water. The typical Reynolds number for the envisaged pilot scale prototype (size ~1 m×20 m in a 2 m/s flow for estimated peak electric power rating of 250 kW) is around $2\times10^6$. The fluid dynamic time scales and forces are different for the experiments in the two fluids. The scale for the fluid force on the foil is given by $pU^2A$, while the typical time scale is given by L/U (L being the width of the foil). For the wind tunnel, this leads to forces of order 1 N and timescales in the 10 ms range. In water, typical forces are 10 N while the time scales are slower, around 100 ms. In all cases these are well within the range of our measurement and control capabilities.

In addition to monitoring the power flow through system (to determine the equivalent energy harvesting performance) a complete set of flow diagnostic tools will be used. Hot wire anemometers can be used to measure the local instantaneous velocity (and shed vorticity) with high temporal resolution. Particle Image Velocimetry (PIV) will be used to obtain global measurements of the flow field around the hydrofoil. These measurements give detailed information about the unsteady vortex behavior central to the enhanced performance of our system.

At this stage, we will measure the power that can be harvested from the flow. The power flow is determined by using the expression:

$$P = \frac{1}{T}\int_0^T -(F_{cp}v + \tau_{cp}\omega)dt,$$

where $F_{cp}$ is the cyber-physical force on the foil, v is its linear velocity, $\tau_{cp}$ the cyber-physical torque, $\omega$ the angular velocity and T is the interval over which the motion periodically repeats itself. Each component of the integrand will be measured in our experiments and the integration carried in software to determine the net power flux. A negative integral denotes power flow from the hydrofoil into the fluid while a positive value indicates energy harvesting.

Unlike the behavior of turbines, the power transient (integrand in (4)) during one oscillation of the hydrofoil is not constant, and in fact it does not even have to be positive. The integrand may very well be negative, which reflects temporarily sacrificing some energy to move the hydrofoil for example when the cyber-physical damping has a negative value. However, we can ensure that such temporary sacrifice will always be accompanied by an even greater benefit. As we see in next section, some of the optimization algorithms we implement work by starting with a cyber-physical state which corresponds to positive value for the integral in (4) and gradually increasing its value by successively changing the cyber-physical state. Algorithms based on strict gradient ascent (i.e. always change the state towards increasing value of the objective function) always result in improvements in the energy harvested. A direct consequence of this property of the algorithms is that if the algorithm evolves the cyber-physical state towards temporary sacrifice, we are going to get an even more gain in benefits because the sum has to be positive.

When immersed in a fluid stream, in this case a wind tunnel was utilized in a laboratory, the foil member oscillates due to vortex shedding from the leading and trailing edges and, as FIG. 5 illustrates, over a range of parameter there is net flow of energy from the fluid to the motor/generator, indicating energy harvesting. The system of FIG. 3 was operated at varying mean angles attack to the oncoming stream, and pitching amplitudes ranging from 2° (blue) to 10° (red) which is plotted on FIG. 5. The oscillation frequency is f—40 Hz corresponding to a non-dimensional value of f L/U—0.07. Note, that for the moderate range of inclination angles the work per unit cycle is positive (above the dotted line), meaning that the system was harvesting energy from the field.

Figure 20A:
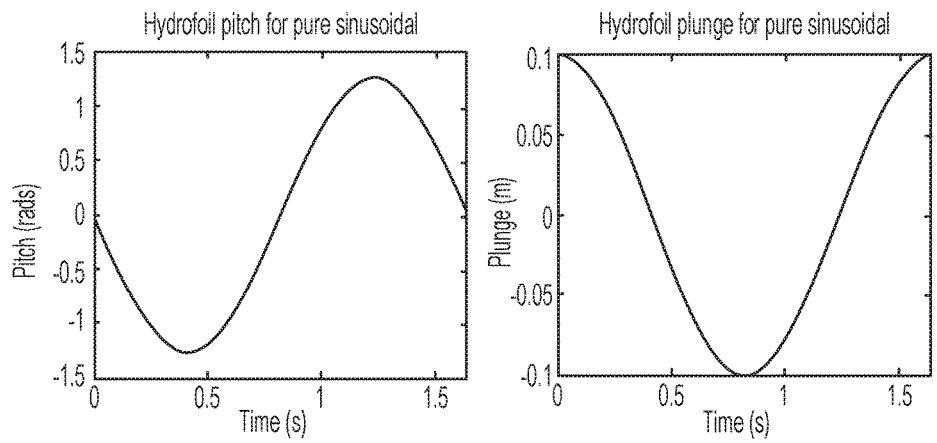
FIG. 20A is a graph showing data and operating efficiency from Experiment I using the cyber-physical system of FIG. 3.

FIG. 5 shows that while the quasi-steady prediction is accurate when the foil member is approximately aligned with the flow, energy can indeed be extracted at high average angles of attack, when the quasi-steady approximation fails. As noted, experiments were performed with oscillating the foil sinusoidally with pitching amplitudes ranging from 2-10° about different mean angles of attack of the foil. For small mean angle of attack the quasi-steady theory holds and the work extracted per cycle of oscillations is negative. However, beyond an angle of attack of about 10°, the airfoil stalls and unsteady effects become important. It appears that in a small range of mean angle of attack the motion of the foil is able to extract positive value of energy from the flow. This observation is strongly suggestive that unsteady effects can be used beneficially for hydro-kinetic power conversion. Moreover, the energy extracted is maximum at a mean angle of attack of about 15°, for an oscillation amplitude of 10°. Also, a gradient ascent algorithm is able to locate this optimum. Referring to FIG. 20A, utilizing the system of Experiment I using a pure sinusoidal with respect to pitch and plunge, the operating efficiency was increased by 17.6%.

Experiment II

Referring to FIGS. 8-17, another experiment was conducted in a water tank using a similar, but not identical system, of Experiment I. Experiment II was conducted to provide evidence of the optimized operation using optimization algorithms of the foil members situated in the fluid flow to attain or more optimization objectives. Referring to FIGS. 8-17, a cyber-physical system 10 for kinetic energy conversion utilizing optimization algorithms is shown.

Figure 20B:
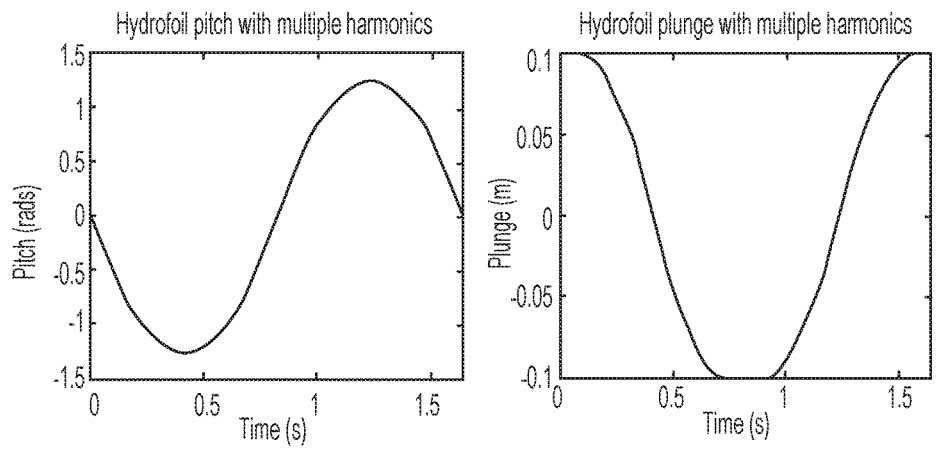
FIG. 20B is a graph showing data and operating efficiency from Experiment H using the cyber-physical system of FIGS. 8-17.

Referring to FIG. 20B, by using the optimization algorithms discussed further below, any by using multiple harmonics with respect to pitch and plunge optimization, the operating efficiency was increased by 20.6%.

Optimization Variable and Algorithms

The objective is to develop algorithms to be tested in the wind tunnel and the water channel. A test was planned for a variety of algorithms with varying complexities. Theoretically, the choice of the control process is divided into two parts: the optimization parameters and the optimization algorithm. The simplest control parameters are started by mimicking physical properties artificially with the cyber-physical feedback. The motion on the hydro-foil is governed by an equation of the form $$M\ddot{h}+C_h\dot{h}+K_h h=F_{hd}+F_{cp},$$

$$I\ddot{\theta}+C_\theta\dot{\theta}+K_\theta\theta=\tau_{hd}+\tau_{cp},$$

where $\theta$ and h denote the pitch and the plunge variables, M is the mass of the hydrofoil, I is its moment of inertia, $C_h$ and $C_\theta$ axe the damping coefficients, $K_h$ and $K_\theta$ are the spring stiffnesses corresponding to the two degrees of freedom, and the terms on the right hand side denote the hydrodynamic (subscript hd) and cyber-physical (subscript cp) forces and torques respectively. We use the cyber-physical actuators to mimic springs, masses and dampers. For example, by using a cyber-physical feedback torque proportional the angular displacement $\tau_{cp}=-K_{\theta,cp}\theta-C_{\theta,cp}\dot{\theta}-I_{cp}\ddot{\theta}$, hydrofoil pitch satisfies $$(I+I_{cp})\ddot{\theta}+(C_\theta+C_{\theta,cp})\dot{\theta}+(K_\theta+K_{\theta,cp})\theta=\tau_{hd}, \quad (7)$$

and under goes motion of a virtual hydrofoil of inertia. $I+I_{cp}$, damping $C_\theta+C_{\theta,cp}$ and torsional print stiffness $K_\theta-K_{\theta,cp}$. Since the cyber-physical variables can be changed in software, they form ideal candidates for optimization.

The optimization variables may be interpreted as the linear and nonlinear coefficients of the spring stiffness, damping coefficient, inertia, and form a finite dimensional space to optimize from, but are not necessarily restricted to physically achievable values, as long as on average energy is extracted from the flow and not fed in by the control system. For example, the cyber-physical added mass and moment of inertia could be made negative to offset some of the real inertia and thus accelerate the motion of the hydrofoil.

At the next level of optimal parameters are transient. There is no need for the cyberphysical variable to be constants; they can vary on the time scale of the oscillations. For example, it may be necessary to make the damping coefficient negative for a small part of the oscillation cycle where the hydrodynamic damping is largest. In this case, the optimization variables become functions of time and form an infinite-dimensional vector space. Optimization over this infinite-dimensional space requires advanced techniques, but this added complexity also allows fine control over the resulting flow, for example over the pattern of shed vorticity. Note that in essence optimizing the cyber-physical variables is mathematically equivalent to optimizing the transient cyber-physical force and torque, because ultimately it is the forces and torques that control the motion. The optimization problem may thus be posed as:

$$\max_{F_{cp}(t),\tau_{cp}(t),T} P = -\frac{1}{T}\int_0^T (F_{cp}\dot{h}+\tau_{cp}\dot{\theta})dt,$$

subject to the hydrodynamic motion of the fluid in response to this actuation. Note, that the motion of the fluid is not solved computationally but observed and measured experimentally. One may also include any additional constraints (such as the maximum rated cyber-physical torque the motor can generate) to this optimization problem. This optimization fits in the framework of optimal control, not to achieve a particular trajectory for the hydrofoil but to harvest the most energy from the flow.

Optimization algorithms are iterative processes, where the user successively improves the objective by trying different value of the optimization variable. The algorithms we plan to use both deterministic and stochastic algorithms for optimization. The next iteration depends deterministically on the result of the current iteration in deterministic algorithms, while in stochastic algorithms an element of randomness also plays a role. The deterministic algorithms may be further classified into function value based, where only the function value can be used, and gradient based, where the gradient of the objective function with respect to the optimization variables is also used. The optimization algorithms are identical to the ones used in numerical optimization, with the exception that the objective function in cyber-physical systems is measured physically. The cost of optimization is expressed in terms of the number of objective function evaluations, and this translates into the number of measurements required to find the optimum. The three algorithms we plan to use (names of the algorithms reflect the conventional minimization of the objective) are:

1. The Nelder-Meade Downhill Simplex method: This is a robust method for finite-dimensional multi-variable optimization using a N-dimensional simplex of variables in the parameter vector space. The simplex is updated in each iteration depending on the value of the objective function on its vertices, simulating motion towards the optimum.

This is a deterministic method requiring only the objective function value and does not require gradient information. The method is very easy to implement to optimize over a few variables, but the simplex size grows with the dimension of the number of variables and rapidly becomes infeasible because a large number of measurements are required to find the optimum.

2. Gradient descent: The prototypical gradient based algorithm corresponds to simply moving uphill (downhill) for maximization (minimization) in the direction of steepest change of the objective function. The simplex method decelerates prohibitively in convergence speed for optimization over a large number of variables, but gradient based algorithms are ideal for such situations if the gradient is known. While the method is simple to implement if gradient information is available, in our case the gradient needs to be estimated from real-time measurements. Techniques like conjugate gradients can be used to ascend towards the maxima and adjoints can be used for gradient estimation in these situations. However, the gradients and conjugate directions can only be exactly known from the detailed flow field, which we obtain in the lab.

3. Simulated annealing: A drawback of deterministic optimization methods is that they are prone to find local rather than global optima. Stochastic methods, like simulated annealing, have the advantage that the mathematics behind the method guarantees convergence to the global optimum starting from any initial condition. The stochastic component of the method can essentially be incorporated with any deterministic method. Essentially, simulated annealing does not necessitate iteration sequence, where the objective function value monotonically increases, but allows updates in which the objective function temporarily decreases, in order to escape trapping in local optima.

Collaborative: Unsteady fluid dynamics play a significant role in the optimal behavior of our cyber-physical system, as the preliminary data illustrates. The performance of the system on a sound basis by visualizing the flow to demonstrate unsteady behavior. While on one hand flow visualization is a useful diagnostic for developing gradient based heuristic algorithms, on the other hand it provides a scientific explanation for the performance of the cyber-physical system.

The optimization algorithms will be tested under three flow conditions (i) steady, (ii) gradually changing, and (iii) intermittent. Tests under these conditions are instrumental in verifying the transient response of the cyber-physical system. Experiments in steady flow confirm that the individual components and the integrated system is functioning properly.

It also demonstrates that the optimization algorithm improves the efficiency of the energy conversion and converges on the maximum. While the imposed oncoming flow is steady, the system response is inherently unsteady. The knowledge of the optimal performance under steady state is necessary to evaluate the system performance under unsteady state.

In the next stage a gradually changing oscillatory flow is setup to simulate the mean tidal behavior, and deduce the ability of the system to track the maximum power efficiency. The small departure from steadiness is expected to result in a small departure from the optimal steady performance, as the system successively tracks the optimal, and possibly lags behind it. The departure from steady optimality depends on the convergence rate of the optimization algorithms as they approach the optimum. Thus different algorithms will perform differently under unsteady conditions even if they all lead to identical maxima under steady state. It is also possible that some algorithms are capable of predicting the future state by suitably "extrapolating" the past behavior and thus account for the transient more accurately than others. The third stage of these experiments under intermittent flow probes the global convergence properties of the algorithms. A sudden transient like a passing wave or a vessel can temporarily alter the flow around the device and thus throw it off its optimal stroke. This scenario is quite realistic and it is crucial that the system recovers from such transients. The steady and transient scenarios are easily set up by controlling the flow rate through the channel and provide invaluable information regarding the performance of these algorithms.

Embodiment of the present invention including the controller system and the feedback control loop system may operate on a network for implementing the system of the present invention. By way of example, the system can be employed in conjunction with a computer-based system, where the elements can be implemented in hardware, software, firmware, or combinations thereof. Network may include workstations, specialist workstations, and intermediary workstations. Each of the workstations may be configured to communicate with an application server via internet connections. The server may include processors and memory for hosting different versions of the software, with respect to the detailed description of the exemplary implementation.

Any combination of one or more computer readable medium(s) may be utilized in the present invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Therefore, while there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A system comprising:
   a shaft operable to oscillate along a second axis perpendicular to a first axis;
   a foil member extending, within a bi-directional fluid flow, along a third axis perpendicular to both the first axis and the second axis, the foil member coupled to the shaft at a central location to allow rotation around the third axis;
   sensors embedded within the foil member to measure an angular displacement and a pitching torque exerted by the fluid on the foil member; and
   a feedback control loop system operationally connected to the foil member to actuate the foil member, the feedback control loop system having an electric motor/generator or servo motors which controls and manipulates pitch angle, the feedback control loop system causing the foil member to adjustably pitch around the third axis such that the bi-directional fluid flow contacts the foil member to cause the shaft to oscillate along the second axis, the feedback control loop system monitoring an angular displacement and applying a restoring torque proportional to the angular displacement imitating a torsional spring.

2. The system of claim 1, wherein the foil member is a hydrofoil member configured to have two degrees of freedom to pitch and plunge.

3. The system of claim 1, wherein the foil member is an airfoil member configured to have two degrees of freedom to pitch and plunge.

4. The system of claim 1, wherein the feedback control loop system comprises a sensor system configured for directly or indirectly measuring and monitoring a contact force between the foil member and the bi-directional fluid flow and a quantity of energy extracted during a predetermined time interval.

5. The system of claim 4, wherein the sensor system is configured to determine the energy extracted by monitoring and measuring degrees of freedom of motion and its conjugate forces with respect to the foil member.

6. The system of claim 4, wherein the sensor system is connected to the foil member.

7. The system of claim 4, wherein the feedback control loop system comprises an actuator system operationally connected to the foil member, the actuator system configured to manipulate the degrees of freedom of motion of the foil member.

8. The system of claim 7, wherein the actuator system is configured to submerge the foil member near or on a bed of a body of water when inactive.

9. The system of claim 7, wherein the feedback control loop system comprises a controller system operationally connected to the sensor system to receive the sensor data and the actuator system to manipulate the foil member.

10. The system of claim 9, wherein the controller system is operated by an optimization algorithm utilizing the sensor data.

11. The system of claim 10, wherein the controller system is configured for instructing the actuator system to manipulate the foil member to attain one or more optimization objectives.

12. The system of claim 11, wherein the controller system comprises software for automatically determining the manipulation of the foil member to attain the one or more optimization objectives.

13. The system of claim 1, wherein the feedback control loop system measures a quantity of energy extraction from the fluid flow.

14. The system of claim 1, wherein the feedback control loop system measures a quantity representing the effect downstream of the foil member to cause modified turbulence, mixing, or sediment deposition.

15. The system of claim 1, wherein the feedback control loop system measures a quantity representing the force the bi-directional flow exerts on the foil member.

16. The system of claim 1, further comprising:
one or more support mechanisms connected to the shaft to provide stability and support.

17. The system of claim 1, further comprising:
means for extracting energy from the oscillatory movement of the shaft.

18. The system of claim 1, at least one additional foil member extending, within the bi-directional fluid flow, along the third axis, the additional foil members coupled to the shaft at a central location to allow rotation around the third axis.

19. The system of claim 18, further comprising:
linking means for allowing the foil members to oscillate within the fluid flow.

20. A computer-implemented method comprising:
providing a shaft configured for oscillatory movement along an axis perpendicular to fluid flow;
coupling a foil member to the shaft, the foil member configured for one or more degrees of freedom of oscillatory movement within the fluid flow;
embedding sensors within the foil member to measure an angular displacement and a pitching torque exerted by the fluid on the foil member; and
using a feedback control loop system to actuate the foil member to oscillate within the fluid flow to generate a force between the foil member and the fluid flow the force causing the foil member to make the shaft oscillate along the axis, the feedback control loop system having an electric motor/generator or servo motors which controls and manipulates pitch angle, the feedback control loop system monitoring an angular displacement and applying a restoring torque proportional to the angular displacement imitating a torsional spring.

21. The method of claim 20, wherein the foil member is a hydrofoil member configured to have two degrees of freedom to pitch and plunge.

22. The method of claim 20, wherein the foil member is an airfoil member configured to have two degrees of freedom to pitch and plunge.

23. The method of claim 20, wherein the feedback control loop system comprises a sensor system for directly or indirectly measuring and monitoring the force during a predetermined time interval.

24. The method of claim 20, wherein the feedback control loop system comprises an actuator system operationally connected to the foil member, the actuator system configured to manipulate the degrees of freedom of motion of the foil member.

25. The method of claim 24, wherein the feedback control loop system comprises a controller system operationally connected to a sensor system to receive the sensor data and the actuator system to manipulate the foil member, the controller system operated by an optimization algorithm utilizing the sensor data, the controller system configured for instructing the actuator system to manipulate the foil member.

26. The method of claim 20, wherein the feedback control loop system actuates the foil member to maximize the oscillations of the shaft.

27. The system of claim 20, wherein the feedback control loop system measures a quantity representing the effect downstream of the foil member to cause modified turbulence, mixing, or sediment deposition.

28. The system of claim 20, wherein the feedback control loop system measures a quantity representing the force the fluid flow exerts on the foil member.

* * * * *